US 6,571,248 B1

(12) United States Patent
Kusama

(10) Patent No.: US 6,571,248 B1
(45) Date of Patent: May 27, 2003

(54) DATA PROCESSING METHOD AND APPARATUS

(75) Inventor: Kiyoshi Kusama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/548,296

(22) Filed: Apr. 12, 2000

(30) Foreign Application Priority Data

| Apr. 13, 1999 | (JP) | ............................................. 11-105742 |
| May 27, 1999 | (JP) | ........................................... 11-148742 |
| Apr. 7, 2000 | (JP) | ....................................... 2000-107127 |

(51) Int. Cl.[7] .............................................. G06F 17/30

(52) U.S. Cl. ....................................... 707/100; 707/101

(58) Field of Search ................................. 707/100, 101, 707/102, 103, 104, 200; 709/231; 725/32

(56) References Cited

U.S. PATENT DOCUMENTS 6,356,946 B1 * 3/2002 Clegg et al. ................. 709/231
6,357,042 B2 * 3/2002 Srinivasan et al. ........... 725/32

\* cited by examiner

*Primary Examiner*—Sanjiv Shah
(74) *Attorney, Agent, or Firm*—Fitzpatrick, Cella, Harper & Scinto

(57) ABSTRACT

A data processing method for registering meta-data in binary data loads data to be processed including binary data, and meta-data to be appended to the binary data. If it is determined that the loaded meta-data has a correct format, it is checked if existing meta-data is present in the loaded data to be processed. If existing meta-data is present in the data to be processed, new meta-data is formed on the basis of the existing meta-data included in the data to be processed, and the loaded meta-data. The new meta-data is connected to the end of the binary data in the data to be processed, and the connected data is output as a file.

27 Claims, 24 Drawing Sheets

FIG. 16

```
<?xml version="1.0"?>
<PHOTOXML>
  <ALBUM>
    <PICTURE>
      <PICPATH>http://www.abcd.co.jp/images/01.jpg</PICPATH>
    </PICTURE>
    <PICTURE>
      <PICPATH>http://www.abcd.co.jp/images/02.jpg</PICPATH>
    </PICTURE>
    <PICTURE>
      <PICPATH>http://www.abcd.co.jp/images/03.jpg</PICPATH>
    </PICTURE>
  </ALBUM>
</PHOTOXML>
```

FIG. 18
01.jpg 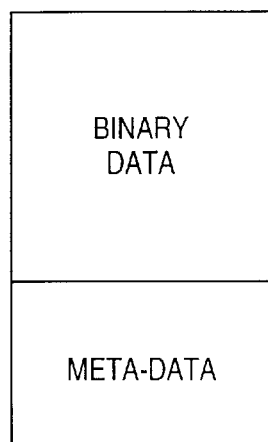
02.jpg 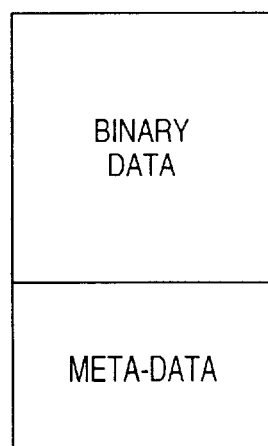
03.jpg 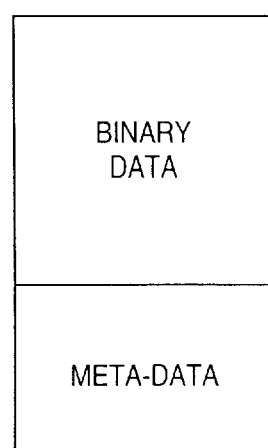

DATA PROCESSING METHOD AND APPARATUS

FIELD OF THE INVENTION

The present invention relates to a data processing method and apparatus, which process binary data and meta-data, and a storage medium.

BACKGROUND OF THE INVENTION

Meta-data is "data pertaining to data", and is used as data that explains binary data such as image data, audio data, and the like. However, when binary data and corresponding meta-data are present as independent files, the user must manage the binary data and meta-data at the same time upon moving or copying files, resulting in inconvenience.

In general, in order to facilitate management of binary data and meta-data, various methods that describe binary data and meta-data have been proposed. Such conventional techniques can be categorized into methods of defining new binary formats, and methods that manage those data using databases.

As examples of the method of defining a new binary format, Tiff, Exif, Flashpix, and the like are known as new image formats. FIG. 21 shows the concept of a format in which meta-data is embedded in binary data. As binary data, for example, image data is used. As shown in FIG. 21, a field for describing meta-data is normally allocated in the header field of an image, and the user describes meta-data in that field. By describing meta-data in such way, data can be easily searched and classified. Since binary data includes meta-data, they can be managed by a single file, thus allowing relatively easy file management.

A method of managing binary data and meta-data using a database will be explained below. FIG. 22 shows the concept of the method of managing binary data and meta-data using a database. The method of managing binary data and meta-data, which are present as independent files, using a database or the like, as shown in FIG. 22, is also prevalent. In this case, existing binary data can be used by an existing application without any modifications.

However, the method of defining a new format that describes meta-data, and the method of managing meta-data using a database suffer their respective problems.

When a new format that describes meta-data is defined, existing binary data must be converted into the new format, and meta-data must be described in that new format. Furthermore, in order to search binary data using the meta-data in the new format, an application compatible to the new format is required. That is, in order to describe and use meta-data, a large number of steps and dedicated environment are required. Also, in order to process binary data in such new format (e.g., to reproduce an image if the binary data is image data), an application compatible to that format is required, and an existing application cannot cope with this situation.

In addition, since the description method of meta-data is uniquely determined in the new format, a new search routine must be created to create an application that uses meta-data in the new format. Furthermore, in order to describe meta-data in a new field, the specifications of the format must be changed.

On the other hand, when binary data and meta-data are simultaneously managed using a database, meta-data can be neither registered nor used if database software is not available. Also, in order to display registered meta-data, dedicated software is required. Furthermore, when binary data is read out from the database, meta-data does not come with it, i.e., binary data without meta-data is formed.

Furthermore, in both the aforementioned two methods, upon changing or modifying meta-data, the following problem is posed. That is, when meta-data has already been present, if new meta-data is registered, it is automatically overwritten on old one. Therefore, if the user wants to leave the existing meta-data, he or she must acquire this existing meta-data, and must add and update this meta-data.

When meta-data are provided in different languages (natural languages), meta-data translated into a desired language must be created, and must be added or replace the existing data. When the existing data are replaced, they are lost. On the other hand, when the translated meta-data are added, identical contents are displayed in different languages, resulting in inconvenience.

Furthermore, new binary data may be created by synthesizing a plurality of binary data. In such case, the aforementioned method of defining a new format that can describe meta-data, and method of managing meta-data using a database suffer the following problems.

Upon synthesizing two data in the new format that describes meta-data, meta-data included in these two data are lost or only one meta-data is left.

When a database is used, if binary data for which meta-data have already been registered are synthesized, new meta-data must be added, and one of a plurality of synthesized meta-data must be registered as that for synthesized binary data, resulting in very troublesome operations.

Conventionally, in order to describe a relationship among a plurality of binary data, various methods are used. For example, as an example of describing the relationship among a plurality of binary data, a digital album using a plurality of still images and moving images, and a multimedia document such as a home page using image data and audio data are known.

In such multimedia document including moving image data, still image data, text data, and the like, the relationship among a plurality of binary data is described using a link format file (FIG. 23) that describes the locations of a plurality of still and moving images, a file (FIG. 24) with a format unique to an application, or the like. For example, the link format file is written in, e.g., HTML, and its contents can be confirmed using, e.g., a browser. In a file with a format unique to an application, its contents are confirmed using the corresponding application.

However, both these methods suffer a problem of how to associate a multimedia document that manages a plurality of binary data to that binary data. That is, in case of a format unique to an application, a very large, single file including a plurality of binary data is formed, and it becomes difficult to independently handle data. On the other hand, when the relationship is described in a link format, e.g., in HTML, the relationship among a plurality of binary file cannot be obtained if no HTML file is available, and binary data and its management data cannot often be managed systematically.

SUMMARY OF THE INVENTION

The present invention has been made in consideration of the aforementioned problems that pertain to the description and search of meta-data, and has as its object to allow registration of meta-data in binary data without any influences on existing applications.

It is another object of the present invention to provide binary data registered with meta-data in a format that can be processed by an existing application.

It is still another object of the present invention to save existing meta-data if it is already present, and to allow additional registration of new meta-data.

It is still another object of the present invention to allow presentation of meta-data history when a plurality of meta-data are registered.

It is still another object of the present invention to allow use of existing tools for a data description language by describing meta-data using a general data description language, so as to facilitate development of a compatible application.

It is still another object of the present invention to extract meta-data from binary data in which the meta-data is described, so as to be able to use it in processes such as search, reference, change, and the like.

It is still another object of the present invention to allow effective use of existing meta-data upon describing new meta-data in binary data, which is generated by synthesizing a plurality of binary data.

It is still another object of the present invention to allow selective description of existing meta-data in synthesized binary data depending on purposes, when meta-data have already been registered in correspondence with a plurality of binary data to be synthesized.

It is still another object of the present invention to allow description of only data contained in all meta-data, when meta-data have already been registered in correspondence with a plurality of binary data to be synthesized.

It is still another object of the present invention to allow description of the relationship among a plurality of binary data in each of binary data as meta-data, and to obviate the need for use of an HTML file or album file to describe the relationship among a plurality of binary data.

It is still another object of the present invention to allow search for a plurality of associated binary data based on single binary data by providing meta-data of respective binary data to each binary data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 16 shows an example of meta-data which is used in the fourth embodiment, and describes location information of binary data;

FIG. 18 shows the relationship among binary data to which meta-data are respectively joined in the fourth embodiment;

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
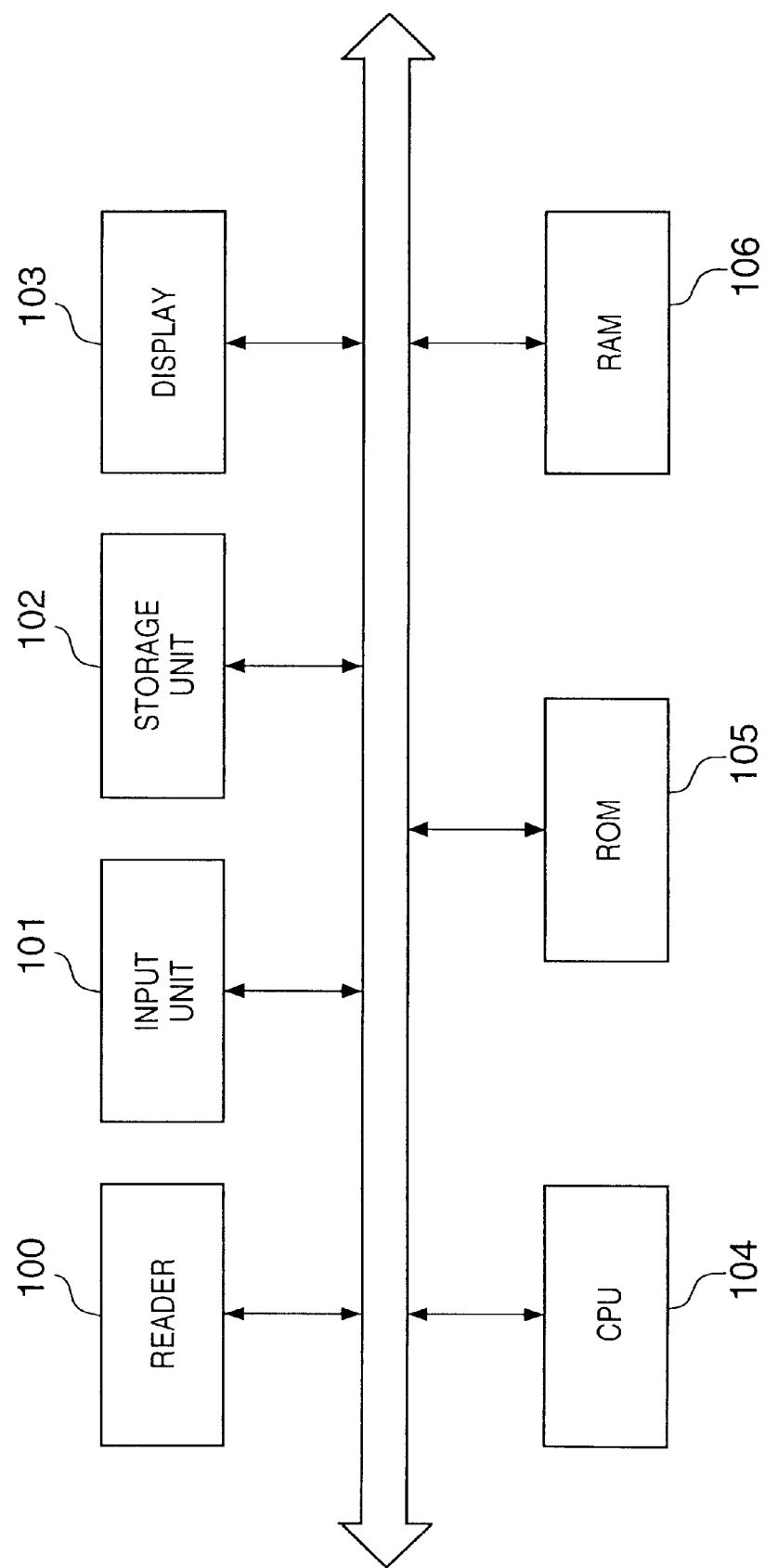
FIG. 1 is a block diagram showing the arrangement of a data processing apparatus according to the first embodiment of the present invention.

FIG. 1 is a block diagram showing the arrangement of a data processing apparatus according to the first embodiment. Referring to FIG. 1, reference numeral 100 denotes a reader, which reads an image using, e.g., a scanner device. Reference numeral 101 denotes an input unit which is used by the user to input an instruction and data, and includes a keyboard and pointing device. Reference numeral 102 denotes a storage unit which stores binary data and meta-data. A hard disk is normally as the storage unit 102. Reference numeral 103 denotes a display which displays binary data stored in the storage unit 102, and image data read by the reader 100. A CRT or liquid crystal display device is normally used as the display 103.

Reference numeral 104 denotes a CPU which is involved in all processes of the aforementioned building components, and a ROM 105 and RAM 106 provide programs, data, or a work area required for such processes to the CPU 104. Note that a control program that implements the processing sequence of this embodiment (to be described later with reference to FIG. 2) is also stored in the ROM 105. Of course, that control program may be stored in the storage unit 102, and may be loaded onto the RAM 106 upon being executed by the CPU 104.

Note that the data processing apparatus of the first embodiment has various other building components in addition to those described above, but they do not constitute the gist of the present invention, and a detailed description thereof will be omitted.

Figure 2:
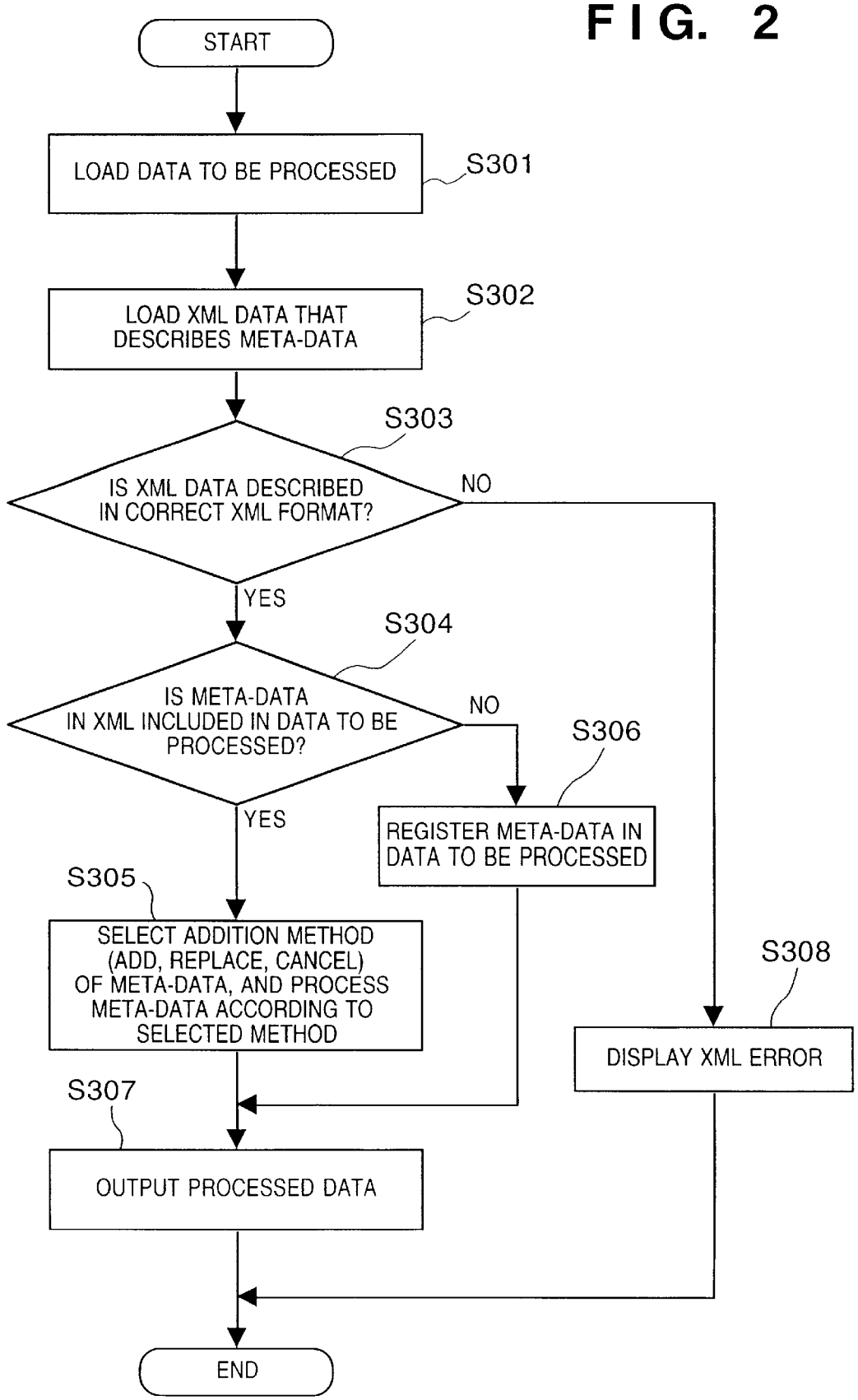
FIG. 2 is a flow chart for explaining a meta-data registration process according to the first embodiment.

A process for registering meta-data in binary data in the data processing apparatus with the aforementioned arrangement will be explained below. FIG. 2 is a flow chart for explaining the meta-data registration process according to this embodiment.

Referring to FIG. 2, data to be processed designated by the user is loaded onto a memory (RAM 106) in step S301. For example, the data is designated by inputting a file name of the desired data to be processed at the keyboard, or pointing to an icon of the corresponding binary data using the pointing device (e.g., a mouse). In step S302, an XML file which is designated by the user and describes meta-data is loaded onto the memory (RAM 106). This XML file is also designated by inputting a file name at the keyboard or pointing to the corresponding icon by the pointing device (e.g., a mouse).

It is checked in step S303 if the XML file that describes meta-data is XML data in a correct format. The correct format is discriminated by checking if the description format of an XML file is satisfied (e.g., if the opening and closing parentheses of tags correctly match, if a tag assignment format is correct, and so forth). Note that it is also checked if XML data is correct as well as if it has a correct format. Whether or not XML data is correct can be determined by checking, e.g., if XML data is described in accordance with a schema such as DTD (Document Type Definition) or the like.

If the XML file is not XML data in the correct format, the flow advances to step S308. In step S308, an XML data error is displayed on the display 103, thus ending this process.

On the other hand, if the XML file is XML data in the correct format, the flow advances to step S304. It is checked in step S304 if meta-data described in XML has already been registered in the data to be processed loaded in step S301. Note that a method of checking if meta-data is registered will be described later with reference to FIG. 7 in the second embodiment.

Figure 4:
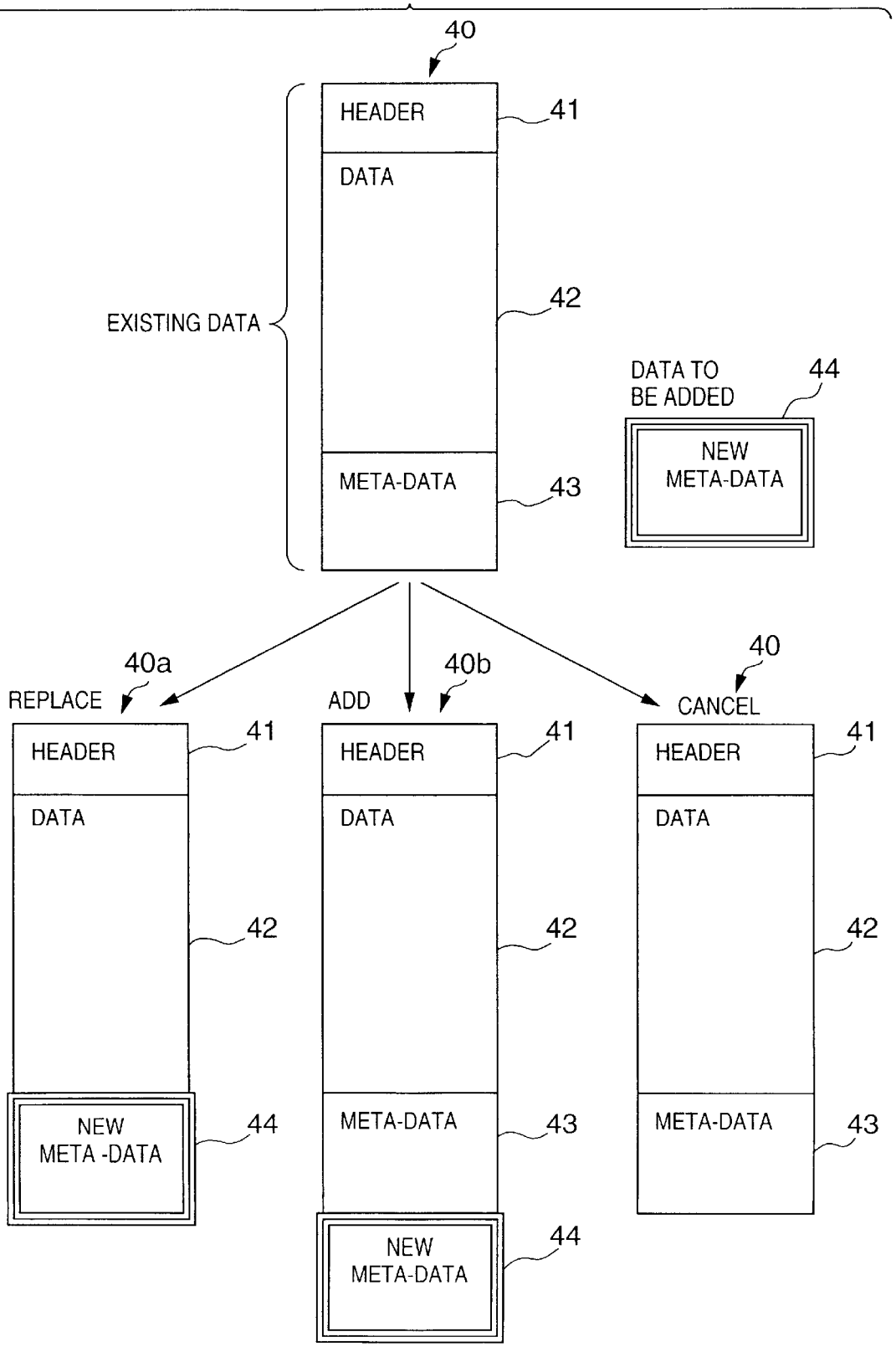
FIG. 4 is a view showing the concepts of replace, add, and cancel processes in the meta-data registration process according to the first embodiment.

If it is determined in step S304 that no meta-data is registered, the flow advances to step S306. In step S306, meta-data is registered by connecting that meta-data to the end of the binary data loaded onto the memory in step S301. After that, the data to be processed registered with the meta-data is output in step S307, thus ending the process. Note that data having a data structure 40 shown in FIG. 4 is stored as one file in the storage unit 102 upon outputting data in step S307 (in this case, the data loaded in step S301 corresponds to binary data composed of a header 41 and data 42, and the meta-data designated in step S302 corresponds to meta-data 43).

On the other hand, if it is determined that the meta-data has already been registered, the flow advances to step S305. In step S305, one of "add", "replace", and "cancel" is selected as a process for that meta-data, and the selected process is done. Details of step S305 will be explained below with reference to the flow chart shown in FIG. 3.

Figure 3:
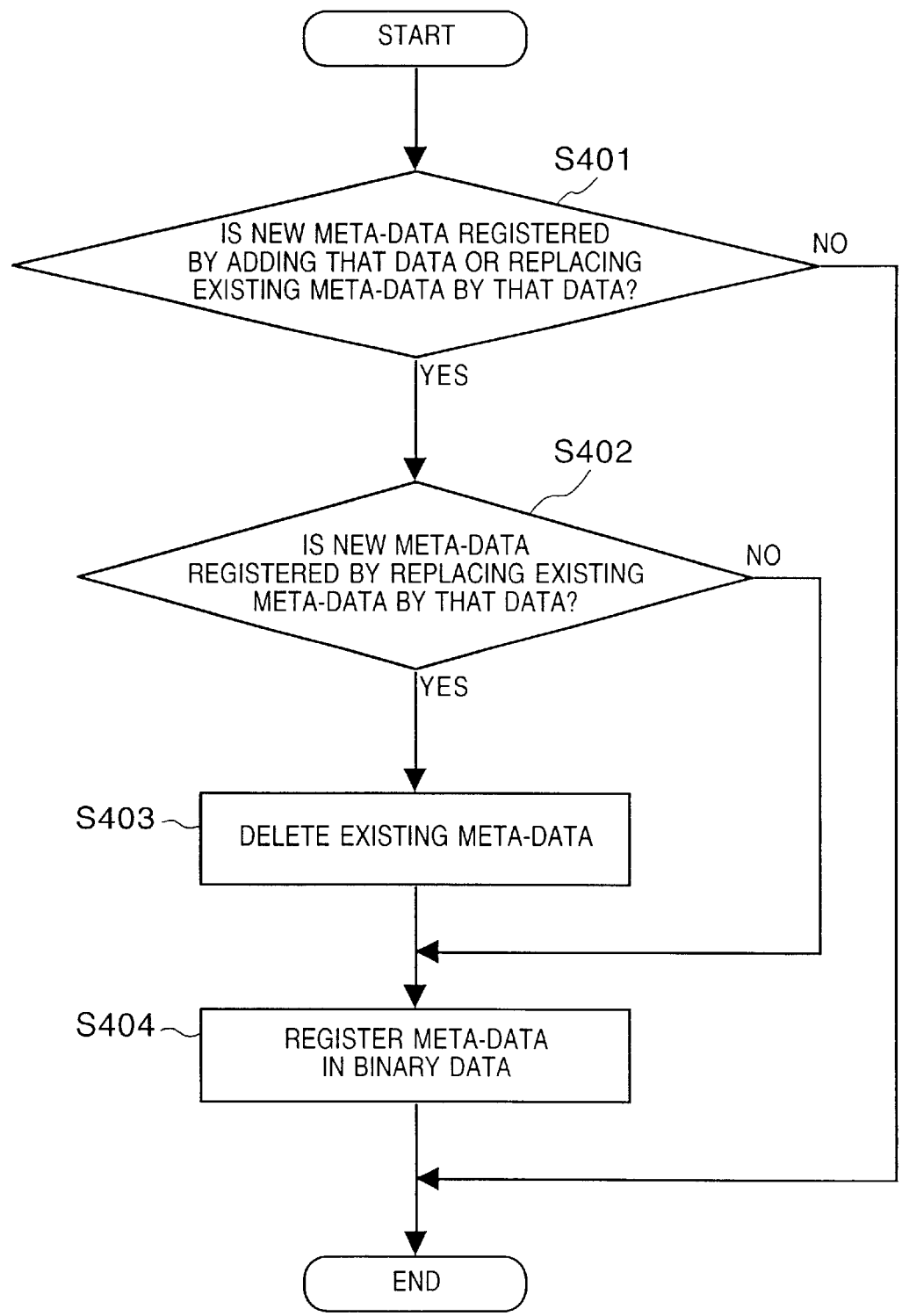
FIG. 3 is a flow chart for explaining details of a meta-data connection process according to the first embodiment.

FIG. 3 is a flow chart showing details of the meta-data connection process according to this embodiment. Note that this process is executed when the user instructs one of "add", "replace", and "cancel" via the input unit 101. This instruction is implemented by generating a key input corresponding to each of these processes at the keyboard, or pointing of a function button using the pointing device.

If it is determined in step S401 that neither "add" nor "replace" are instructed, i.e., "cancel" of meta-data registration is instructed, the process shown in FIG. 3 ends, and the flow advances to step S307 in FIG. 2. On the other hand, if an instruction for registering meta-data by "replacing" or "adding" it is detected, the flow advances to step S402. It is checked in step S402 if "replace" or "add" is instructed.

If a meta-data "replace" instruction is detected, the flow advances to step S403 to delete the existing meta-data. The flow then advances to step S404 to register new meta-data by connecting it to the end of binary data, thus ending the processing. On the other hand, if a meta-data "add" instruction is detected in step S402, the flow jumps to step S404 while skipping step S403. In step S404, meta-data is registered by connecting it to the end of binary data, thus ending the processing.

Upon completion of the processing (step S305) shown in FIG. 3, the flow advances to step S307 in FIG. 2, and the obtained binary data is output. As a result, data having a data structure (to be described later with reference to FIG. 4) is stored as one file in the storage unit 102.

FIG. 4 shows the concepts of replace, add, and cancel processes in the aforementioned meta-data registration process. For example, when registration of new meta-data by "replace" is instructed with respect to binary data 40 in which meta-data has already been registered, meta-data 43 is deleted (step S403), and new meta-data 44 is connected to the end of the binary data (S404), thus generating new data 40a.

On the other hand, when registration of new meta-data 44 by "add" is instructed, the new meta-data 44 is registered at the end of the data (step S404) to generate data 40b. On the other hand, when "cancel" is instructed, no new meta-data 44 is connected.

As described above, according to the meta-data registration process of this embodiment, one or a plurality of meta-data (43 and/or 44) written in an XML file are connected to the end of binary data (composed of the header 41 and data 42). In this manner, meta-data can be registered without any influences on other applications. More specifically, since information in the header field of binary data remains the same as that before connection of meta-data, if binary data is, e.g., image data, an image can be reproduced by a conventional browser (connected meta-data is ignored).

Furthermore, since meta-data is described in XML, if a tool that can interpret XML data is available, meta-data can be added, changed, and referred to, when the XML data contents are extracted, thus assuring very high compatibility. Note that extraction of meta-data contents described in XML will be described in detail in the second embodiment.

Also, according to the first embodiment, new meta-data can be registered in data in which another meta-data has already been registered, without discarding the existing meta-data. For this reason, binary data registered with a plurality of meta-data and binary data having the history of meta-data can be generated.

In the description of the process for registering meta-data by replacing it, when one existing meta-data is present, new meta-data is registered by replacing that existing meta-data (FIG. 4). However, according to this embodiment, when meta-data is additionally registered, a plurality of meta-data can be registered in binary data. In this manner, when a plurality of meta-data are present, and new meta-data is registered by "replace" or "add", various patterns are available.

Figure 5:
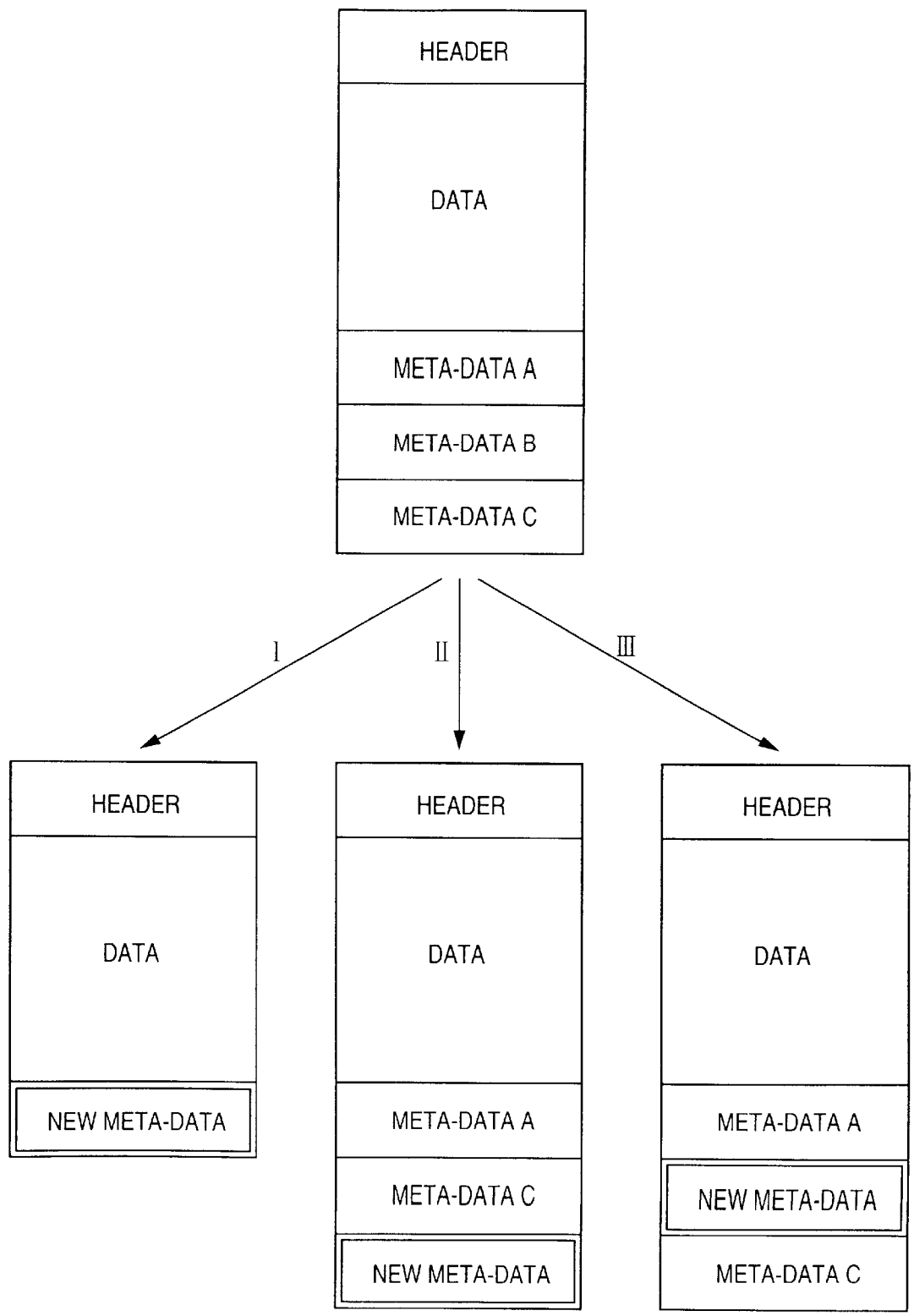
FIG. 5 is a view for explaining the registration process of new meta-data to binary data in which a plurality of meta-data are registered.

For example, FIG. 5 shows a state wherein three meta-data (meta-data A, B, and C) are registered. In such case, when new meta-data is registered by replacing existing data, the following processes can be done.

(1) All existing meta-data (meta-data A to C) are deleted, and new meta-data is connected to the end of binary data (new meta-data replaces all existing meta-data).

(2) One or a plurality of desired meta-data are designated and deleted, the remaining meta-data are/is moved to the end of binary data, and new meta-data is connected to the end of that data.

(3) One desired meta-data is designated and deleted, and new meta-data is inserted into that position (new meta-data replaces desired one existing meta-data).

The aforementioned processes can be implemented using a known data edit technique as long as each meta-data can be extracted. As will be described later with reference to FIG. 7, even when a plurality of meta-data are registered in binary data, since each meta-data can be extracted, desired meta-data can be deleted or meta-data can be inserted in a desired order by a known data edit process, thus implementing various processes including (1) to (3) mentioned above.

Of course, when new meta-data is additionally registered, it can be inserted at the end of binary data (before the existing meta-data).

Second Embodiment

In the first embodiment, the method of registering meta-data in binary data has been explained. In the second embodiment, a process for discriminating whether or not meta-data is registered in binary data, and extracting the meta-data or displaying the history of registered meta-data if it is registered will be explained. Note that the arrangement of the data processing apparatus in the second embodiment is the same as that in the first embodiment (FIG. 1), and a detailed description thereof will be omitted.

Figure 6:
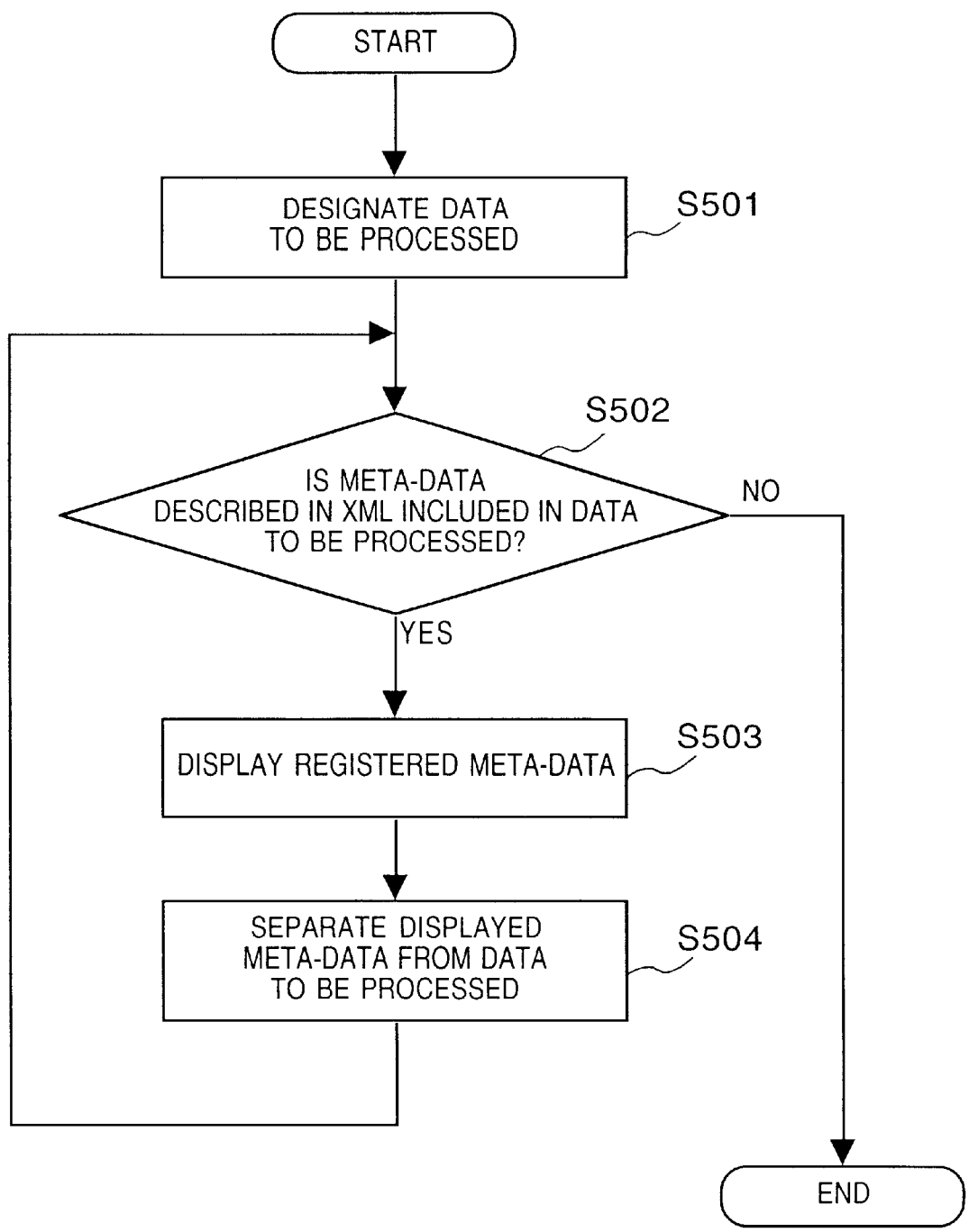
FIG. 6 is a flow chart showing the discrimination/extraction sequence of the registered meta-data according to the second embodiment of the present invention.

The processes for discriminating whether or not meta-data that has been explained in the first embodiment is registered in data of a designated file, and extracting the registered meta-data will be explained below. FIG. 6 is a flow chart showing the discrimination/extraction sequence of registered meta-data according to the second embodiment. In this embodiment, the extracted meta-data is displayed on the display 103, but the present invention is not limited to such specific output mode. For example, it is known to those who are skilled in the art that the extracted meta-data may be provided to a search or edit process.

Figure 8:
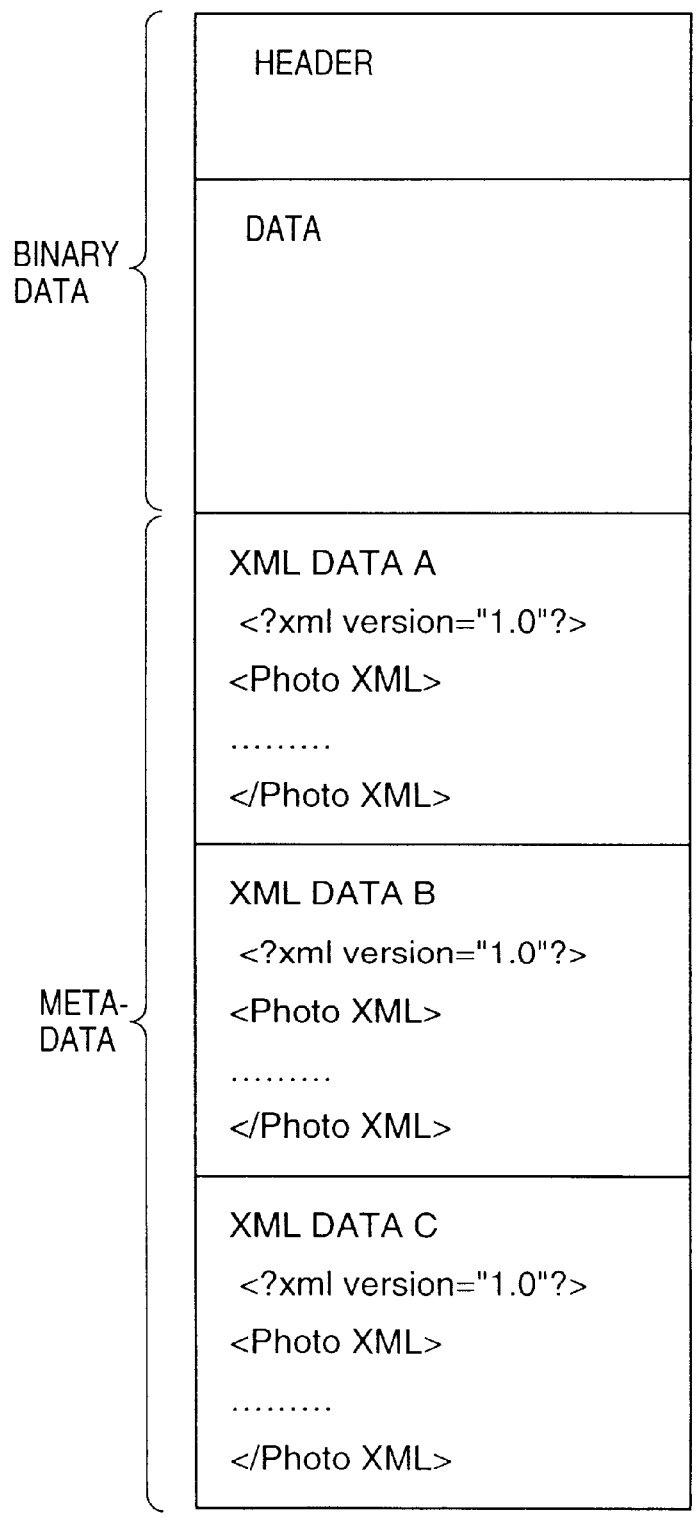
FIG. 8 shows an example of the data format of binary data in which XML data is registered as meta-data.

FIG. 8 shows an example of the data structure of binary data in which XML data are registered as meta-data. As has been explained in the first embodiment, the data structure in which a plurality of meta-data (XML data) are registered is as shown in FIG. 8. FIG. 8 shows a state wherein three meta-data (described in XML) are registered in binary data (composed of a header and data). That is, FIG. 8 shows a state wherein three meta-data are connected in turn by executing the meta-data "add" process described in the first embodiment three times.

In the process shown in FIG. 6, the presence of meta-data is checked in data with the structure mentioned above, meta-data are extracted in turn from end one, and their contents are displayed.

A file which is to undergo discrimination as to whether or not meta-data is registered is designated by a user instruction in step S501. The file to be processed (data to be processed) is designated in step S501 by inputting the file name of the data to be processed at the keyboard or indicating a corresponding icon using the pointing device (mouse).

Figure 7:
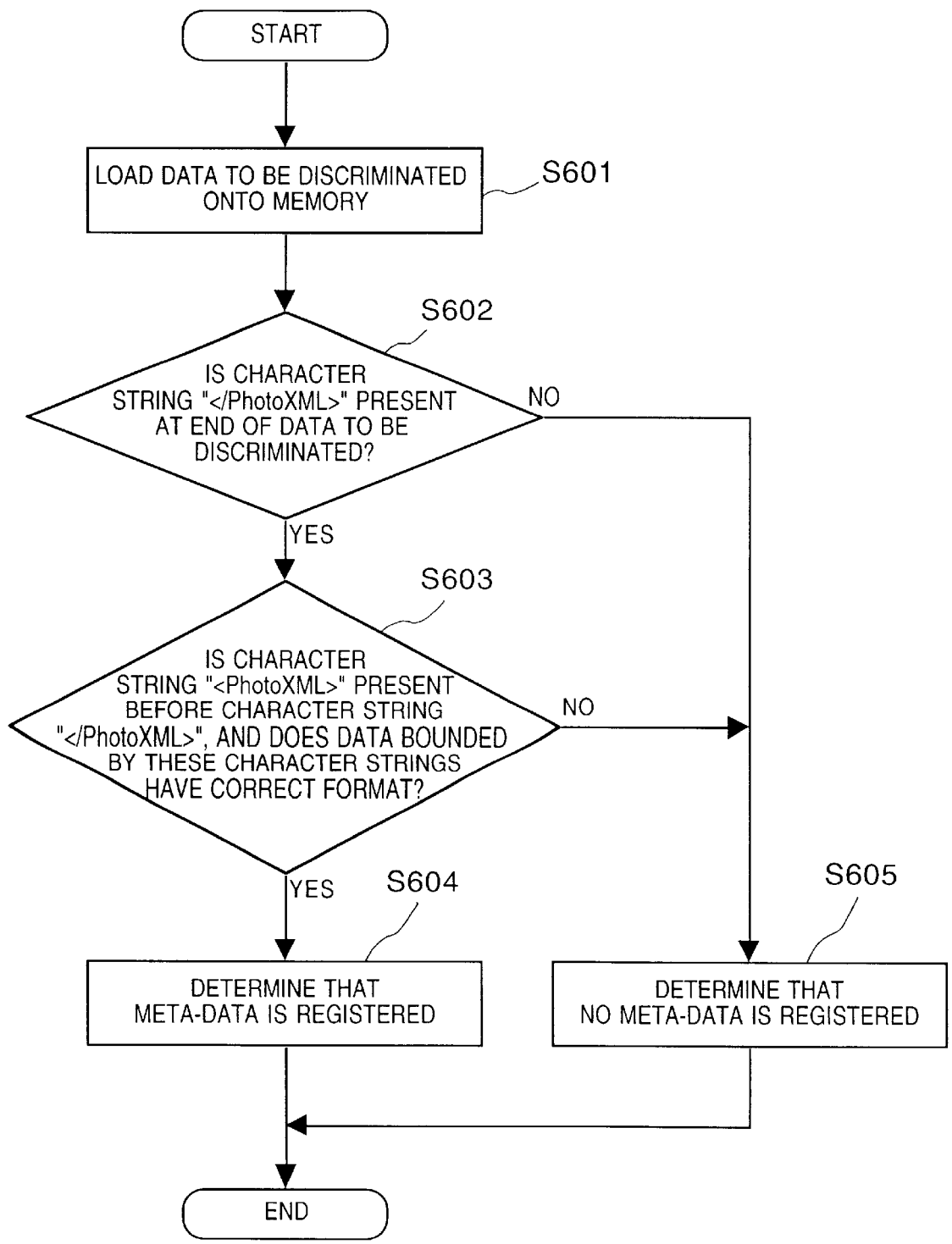
FIG. 7 is a flow chart for explaining details of a meta-data discrimination process according to the second embodiment.

It is discriminated in step S502 if meta-data described in XML is registered in data to be processed of the designated file. Details of the discrimination process in step S502 will be explained below with reference to the flow chart in FIG. 7. FIG. 7 is a flow chart for explaining details of the meta-data discrimination process according to the second embodiment.

As shown in FIG. 7, the entire data of the file designated in step S501 is loaded onto the memory (RAM 106) in step S601. Since the data output in step S307 in the first embodiment is managed as a single file, the entire data can be read out by a general file management system.

It is checked in step S602 if a character string "</PhotoXML>" is present at the end of the data to be processed loaded in step S601. If such character string is not present, the flow advances to step S605.

On the other hand, if the character string "</PhotoXML>" is present at the end of the loaded data to be processed, the flow advances to step S603. It is checked in step S603 if a character string "<PhotoXML>" is present before the character string "</PhotoXML>", and it is also confirmed if data bounded by these character strings is described in a correct XML format. At this time, it may be further checked if that data is correct XML data. Whether or not the data has a correct format and is correct can be discriminated, as has been explained in the first embodiment (step S303).

If it is confirmed in step S603 that the data has a correct format, the flow advances to step S604. It is concluded in step S604 that meta-data is registered, and this process ends. On the other hand, if a correct format is not confirmed in step S603, the flow advances to step S605. It is concluded in step S605 that meta-data is not registered. That is, if it is determined in step S602 that the character string "</PhotoXML>" is not present at the end of the binary data of interest, if it is determined in step S603 that the character string "<PhotoXML>" is not present, or if it is determined in step S603 that described contents bounded by the character strings are incorrect, the flow advances to step S605 to determine that no meta-data is registered in the data to be processed.

In this manner, discrimination of meta-data ends.

Referring back to the flow chart in FIG. 6, if it is determined by the discrimination process shown in FIG. 7 that meta-data is not registered, this processing ends (S502). On the other hand, if it is determined that meta-data is registered, the flow advances from step S502 to step S503. In step S503, the meta-data which is determined to have a correct format in step S603 above (XML data bounded by "<PhotoXML>" and "</PhotoXML>") is extracted and its contents are displayed on the display 103. Then, the meta-data which is extracted in step S603 and displayed in step S504 is separated from the data of interest, and the remaining data is stored in the memory (RAM 106). After that, the flow returns to step S502, and the aforementioned processes repeat themselves for the remaining data. With the aforementioned processes, in FIG. 8 XML data C is separated, and steps S502 to S504 repeat themselves for the remaining data. As a result, XML data B is then extracted and displayed, and after that, XML data A is extracted and displayed.

By repeating the aforementioned processing, if no meta-data is registered, no data is displayed. But if meta-data are registered, all registered meta-data are displayed. When a plurality of meta-data are registered, meta-data are displayed in turn from the latest registered one.

As described above, according to the second embodiment, binary data with meta-data, and normal binary data can be discriminated by checking if XML data is described at the end of data in a correct format. If meta-data is found, that meta-data can be displayed.

More specifically, according to the second embodiment, binary data registered with meta-data can be discriminated from that registered with no meta-data, and the registered meta-data can be extracted. Therefore, when an existing data description language is used as that for describing meta-data, existing tools of that data description language can be used in a search process using meta-data, thus saving extra efforts for development.

Furthermore, when a plurality of meta-data are registered, all these meta-data can be extracted and displayed one by one. Since a plurality of meta-data are registered time-serially, the history of meta-data can be presented to the user by extracting them in turn from the latest one. Or the updating date data may be described in meta-data, and the display order may be controlled in accordance with the description of the dates. In view of history display, only the updating date may be extracted from the meta-data extracted in step S503, and may be displayed.

In the above embodiment, when a plurality of meta-data are registered, all meta-data are output. Alternatively, one or a plurality of those meta-data may be selectively presented. For example, only the latest registered meta-data may be displayed. Or multi-lingual meta-data including a plurality of meta-data in different natural languages may be registered, and only meta-data in a desired language may be extracted. To implement such process, the following process can be added. That is, it is checked between steps S502 and S503 if the registered meta-data matches an extraction condition (language type or the like). If the meta-data matches the extraction condition, the flow advances to step S503; otherwise, the flow advances to step S504.

As can be seen from the descriptions of the first and second embodiments, according to the present invention, meta-data can be registered in binary data without any influences on existing applications. That is, binary data registered with meta-data can be provided in a format that can be processed by an existing application.

Also, according to the present invention, if meta-data has already been registered, new meta-data can be additionally registered while saving the existing meta-data.

Furthermore, according to the present invention, when a plurality of meta-data are registered, the history of meta-data can be presented.

Third Embodiment

In the descriptions of the first and second embodiments, when meta-data has already been present in binary data, new meta-data is registered by the "add" or "replace" process, and meta-data are extracted from binary data including a plurality of meta-data obtained in this manner. In the third embodiment, a data processing apparatus which can join binary data having meta-data will be explained. Note that the arrangement of the data processing apparatus in the third embodiment is the same as that in the first embodiment (FIG. 1), and a detailed description thereof will be omitted.

Figure 9:
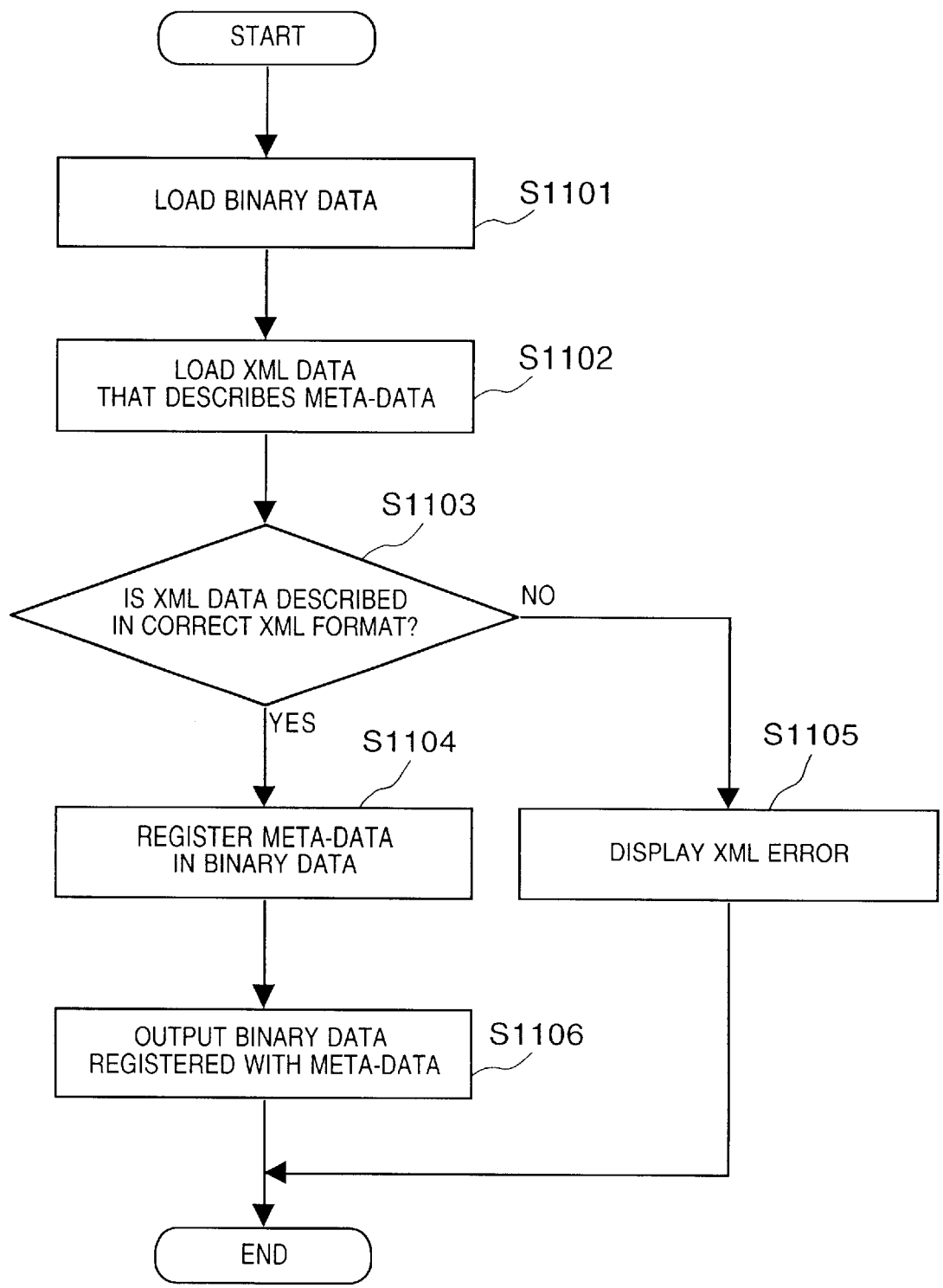
FIG. 9 is a flow chart for explaining a meta-data registration process according to the third embodiment of the present invention.

The process for registering meta-data in binary data in the data processing apparatus of the third embodiment will be explained below. FIG. 9 is a flow chart for explaining a meta-data registration process according to this embodiment.

Referring to FIG. 9, binary data designated by the user is loaded onto the memory (RAM 106) in step S1101. In this case, the binary data is designated by inputting a desired binary data file name at the keyboard, or pointing to an icon of the corresponding binary data using the pointing device (e.g., a mouse). In step S1102, an XML file which is designated by the user and describes meta-data is loaded onto the memory (RAM 106). This XML file is also designated by inputting a file name at the keyboard or pointing to the corresponding icon by the pointing device (e.g., a mouse).

It is checked in step S1103 if the XML file that describes meta-data is XML data in a correct format. The correct format is discriminated by checking if the description format of an XML file is satisfied (e.g., if the opening and closing parentheses of tags correctly match, if a tag assignment format is correct, and so forth). Note that it is also checked if XML data is correct as well as if it has a correct format. Whether or not XML data is correct can be determined by checking, e.g., if XML data is described in accordance with a schema such as DTD (Document Type Definition) or the like.

If it is determined in step S1103 that the XML file is not XML data in the correct format, the flow advances to step S1105. In step S1105, an XML data error is displayed on the display 103, thus ending this process.

On the other hand, if it is determined in step S1103 that the XML file is XML data in the correct format, the flow advances to step S1104. In step S1104, meta-data is registered by connecting that meta-data to the end of the binary data loaded onto the memory in step S1101. After that, the binary data registered with the meta-data is output in step S1106, thus ending the processing. Note that data having a data structure shown in FIG. 10 is stored as one file in the storage unit 102 upon outputting data in step S1106.

Figure 10:
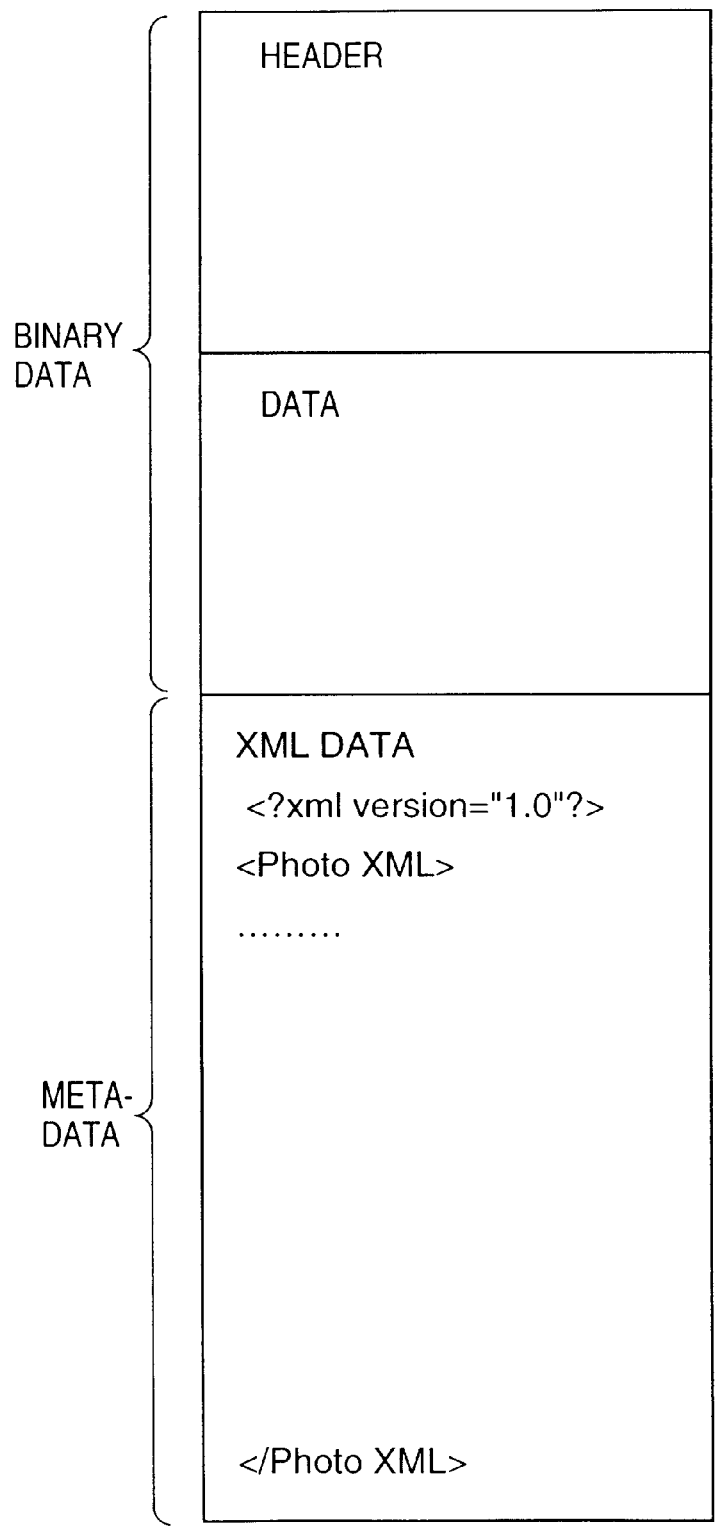
FIG. 10 is a view for explaining the registered state of meta-data in binary data according to the third embodiment.

FIG. 10 is a view for explaining the registered state of meta-data in binary data according to this embodiment. As shown in FIG. 10, by connecting meta-data described in XML data to the end of binary data, meta-data can be registered without any influences on other applications. More specifically, since information in the header field of binary data remains the same as that before connection of meta-data, if binary data is, e.g., image data, an image can be reproduced by a conventional browser (connected meta-data is ignored).

Furthermore, since meta-data is described in XML, if a tool that can interpret XML data is available, meta-data can be added, changed, and referred to, when the XML data contents are extracted, thus assuring very high compatibility. Note that the XML data contents can be extracted as meta-data by searching for tags </PhotoXML> and <PhotoXML> from the end of data, and checking XML correctness of the data bounded by these tags.

Figure 11:
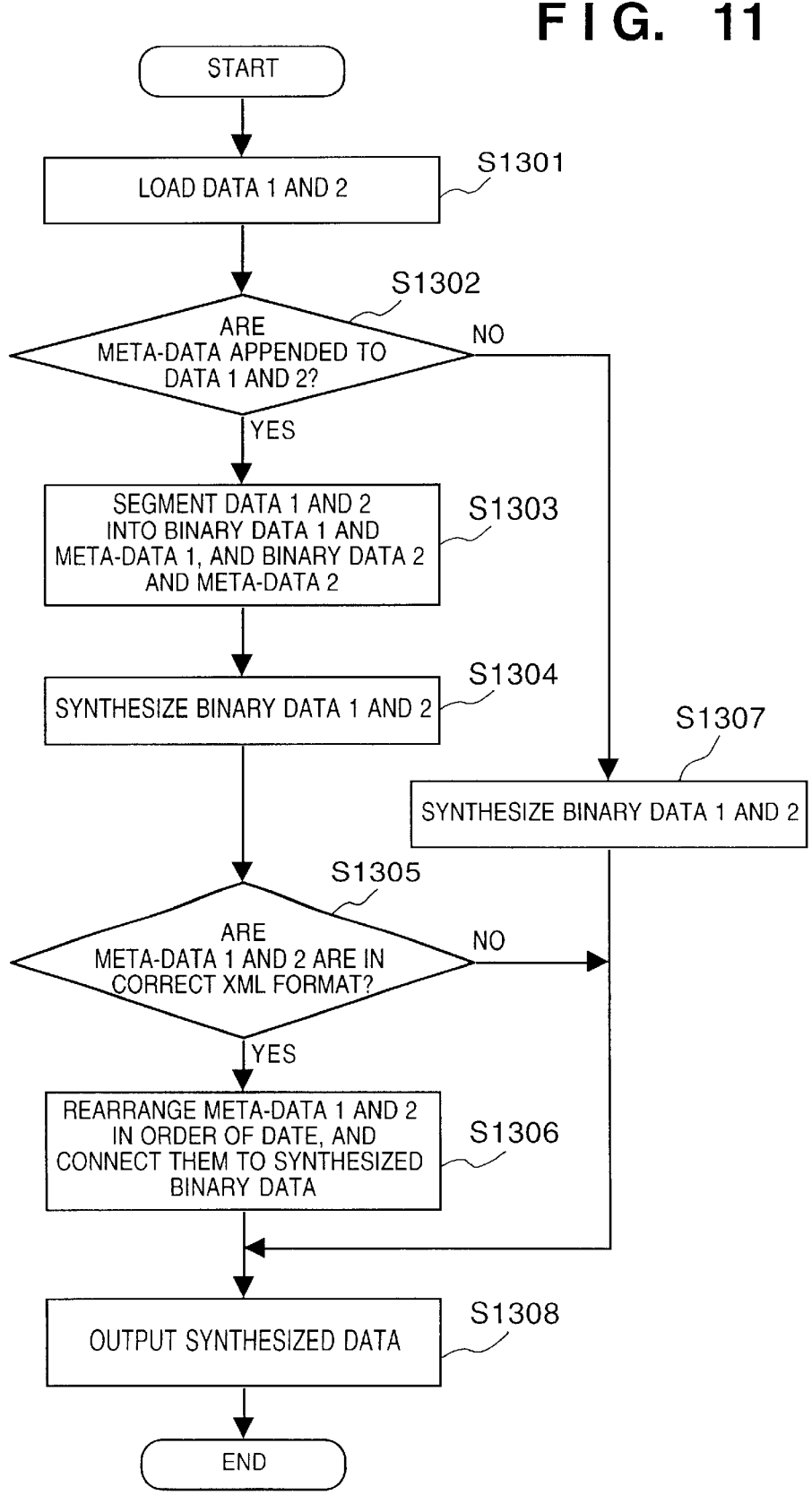
FIG. 11 is a flow chart for explaining the sequence for synthesizing a plurality of data according to the third embodiment.

The process for synthesizing a plurality of data, and registering meta-data by combining individual meta-data will be explained below with reference to the flow chart shown in FIG. 11. FIG. 11 is a flow chart for explaining the sequence for synthesizing a plurality of data according to this embodiment. As will be described below, in this embodiment, when data to be synthesized are appended with meta-data, meta-data are rearranged, and are registered in the synthesized data.

Referring to FIG. 11, data 1 and data 2 which are to undergo a synthesis process are loaded onto the memory in accordance with a user instruction in step S1301. It is checked in step S1302 if meta-data are appended to loaded data 1 and 2. If meta-data are appended, the flow advances to step S1303; otherwise, the flow advances to step S1307.

As described above, the data to be processed registered with XML data as meta-data has a data structure as shown in FIG. 3. Therefore, the presence/absence of meta-data can be discriminated in the sequence mentioned above with reference to FIG. 7. The process explained in FIG. 7 is individually done for data 1 and 2 to check the presence/absence of meta-data.

If it is determined in step S1302 that meta-data are appended, data 1 is segmented into binary data 1 and meta-data 1, and also data 2 into binary data 2 and meta-data 2 in step S1303. The flow then advances to step S1304. In step S1304, binary data 1 and 2 are synthesized.

Figure 12:
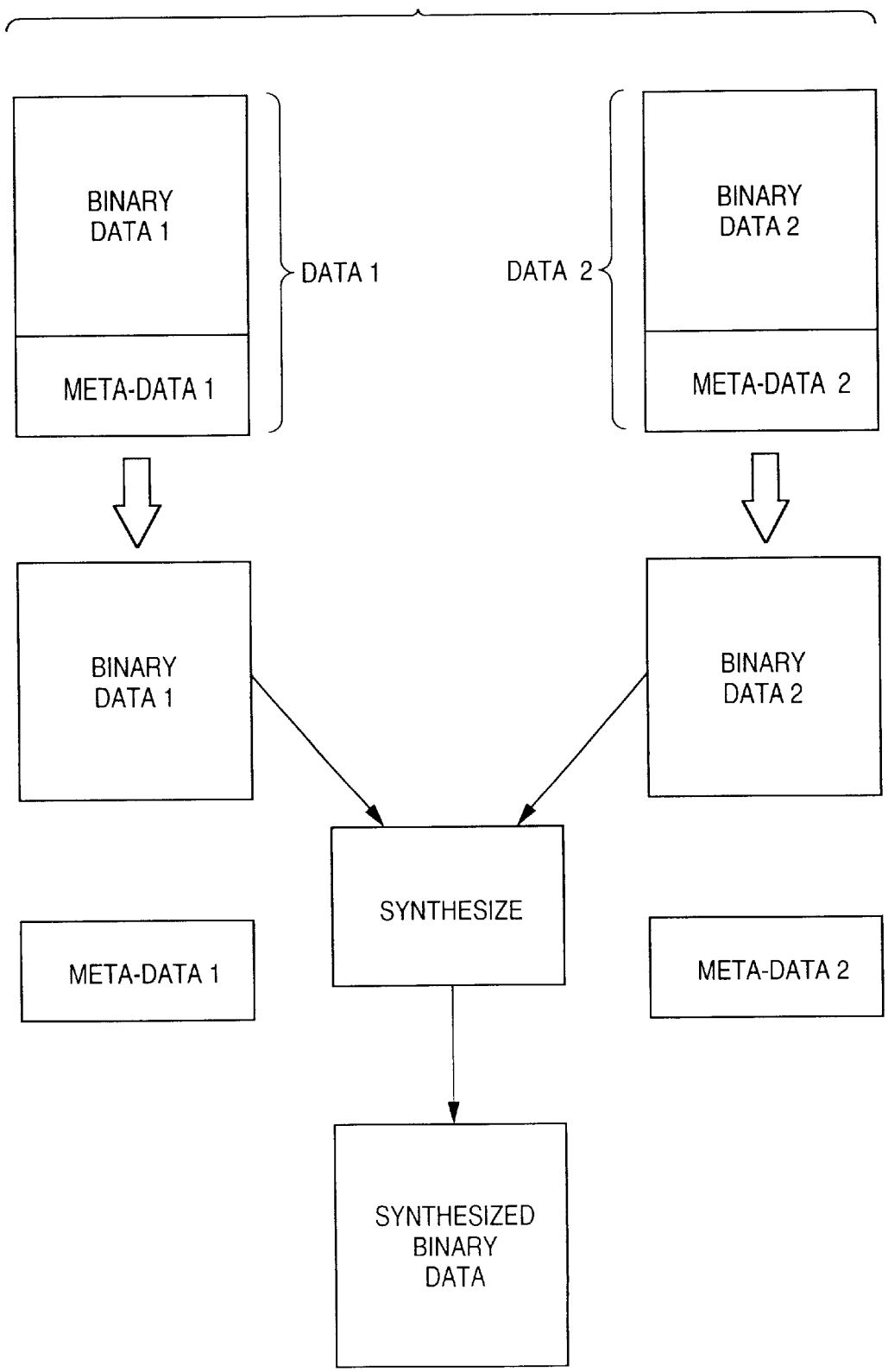
FIG. 12 is a view for explaining the operations in steps S1303 and S1304.

FIG. 12 shows the operations in steps S1303 and S1304. That is, meta-data which are determined to be registered in the discrimination sequence shown in FIG. 7 are respectively separated as meta-data 1 and 2 from data 1 and 2. The remaining data after the meta-data are separated are binary data 1 and 2. The obtained binary data 1 and 2 are synthesized to generate synthesized binary data. Note that synthesis is to generate a new image by superposing individual images or using portions of individual images when data are image data.

If it is determined in step S1305 that the appended meta-data are described in a correct XML format, the flow advances to step S1306 to arrange meta-data 1 and 2 in the order of date, and connect them to the binary data synthesized in step S1304.

In this case, since whether or not the meta-data has a correct format has already been discriminated in step S603 in FIG. 7, step S1305 can use the discrimination result. However, if the correct format is not discriminated in step S603, that discrimination is made in step S1305.

Figure 13:
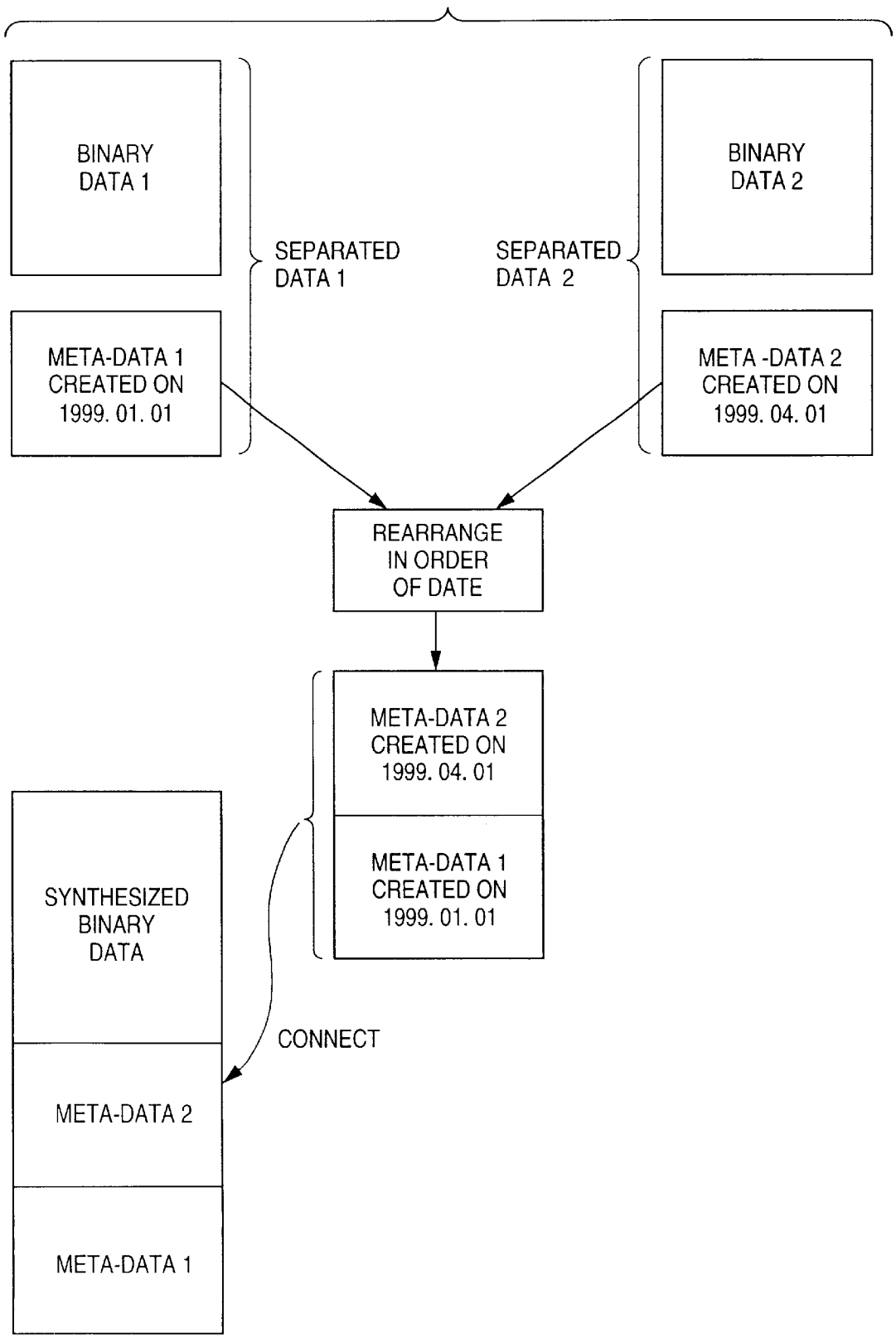
FIG. 13 is a view for explaining the process in step S1305.

FIG. 13 is a view for explaining the process in step S1306. As described above, meta-data 1 separated from data 1 and meta-data 2 separated from data 2 are rearranged in the order of date. The rearranged meta-data are connected to the end of the binary data synthesized in step S1304.

On the other hand, if meta-data are not XML data in a correct format, meta-data 1 and 2 are not connected to the synthesized binary data, and the flow advances to step S1308. On the other hand, if no meta-data is found in the data in step S1302, data 1 and 2 are synthesized in step s1307. After that, the synthesized data is output as one file in step S1308.

With the above-mentioned processes, even when data 1 and 2 may or may not include meta-data, they can be synthesized. When meta-data described in a correct XML format are found, they can be connected to the binary data in the order of date.

More specifically, data including binary data and meta-data can be synthesized, and meta-data can be rearranged in, e.g., the order of date. Furthermore, since meta-data is described in XML, if a tool that can interpret XML data is available, meta-data can be added, changed, and referred to, thus assuring very high compatibility.

Note that discrimination of the correct format of XML data in step S1305 includes that of correct XML data.

In this embodiment, meta-data are rearranged in the date order, but may be rearranged based on other elements contained in the meta-data. The way meta-data are rearranged may be interactively determined by the user. When the meta-data are interactively rearranged, separated meta-data may be displayed, and the user may designate meta-data to be described and their connection order.

In the above embodiment, the process for synthesizing two data has been explained. However, it is known to those who are skilled in the art that the process of this embodiment can be applied to synthesis of three or more data. When one data contains meta-data, and the other does not contain any meta-data, meta-data may be connected to the end of the synthesized binary data without synthesizing meta-data.

In the above embodiment, new meta-data is formed by arranging a plurality of separated meta-data in the order of date. Alternatively, meta-data to be connected to the synthesized binary data may be formed using data selected from a plurality of separated meta-data. For example, meta-data may be reconstructed using the latest one of a plurality of separated meta-data. Or, a predetermined number of meta-data may be selected in descending order of date.

Furthermore, data commonly contained in all of a plurality of separated meta-data may be extracted, and new meta-data may be generated using the extracted data. In this case, since the AND contents of a plurality of meta-data are left as meta-data, the meta-data size can be reduced, i.e., the total data size can be reduced. Note that the method of generating meta-data is not limited to such specific method. For example, the OR contents of meta-data may be left. For example, when one meta-data describes "sea" and "dolphin", and the other meta-data describes "sea", one of the overlapping "sea" data is deleted, and the meta-data generated as a result contains "sea" and "dolphin". In this manner, information described in each meta-data can be prevented from being lost, and identical data can be prevented from being repetitively described.

Also, the order of a plurality of meta-data may be re-determined on the basis of information described in a plurality of separated meta-data. For example, a category of importance may be assigned to each meta-data using a numerical value, and the order of meta-data may be determined in accordance with numerical values described in their categories of importance.

As described above, according to this embodiment, when data in each of which meta-data described in XML is joined to the end of binary data are synthesized, binary data can be synthesized by separating and rearranging meta-data.

Note that the processing described in the second embodiment can be applied to extract meta-data from the synthesized binary data including meta-data.

As can be seen from the description of the third embodiment, according to the present invention, meta-data can be registered in binary data without exerting any influences on existing applications.

Also, according to the present invention, upon describing new meta-data in binary data generated by synthesizing a plurality of binary data, existing meta-data can be effectively used. That is, data in which meta-data have already been registered are synthesized can be synthesized without registering new meta-data.

Furthermore, when meta-data is described in an existing data description language, existing tools of that data description language can be used, thus saving extra efforts for development.

According to the present invention, when meta-data have already been registered in a plurality of binary data to be synthesized, existing meta-data can be selectively used in synthesized binary data depending on purposes.

According to the present invention, when meta-data have already been registered in a plurality of binary data to be synthesized, only data contained in all meta-data can be described.

Fourth Embodiment

The fourth embodiment will explain an application example of binary data including meta-data. In the fourth embodiment, meta-data including a description that associates a plurality of binary data is generated, and is appended to each of these binary data. More specifically, the locations of associated binary data are described in meta-data. Note that the arrangement of the data processing apparatus in the fourth embodiment is the same as that in the first embodiment (FIG. 1), and a detailed description thereof will be omitted.

The sequence for appending meta-data that describes the locations of a plurality of binary data to these binary data will be explained below with reference to the flow chart in FIG. 14. In the fourth embodiment, by designating a plurality of binary data to be associated, meta-data indicating the locations of these binary data is appended to each binary data.

Figure 14:
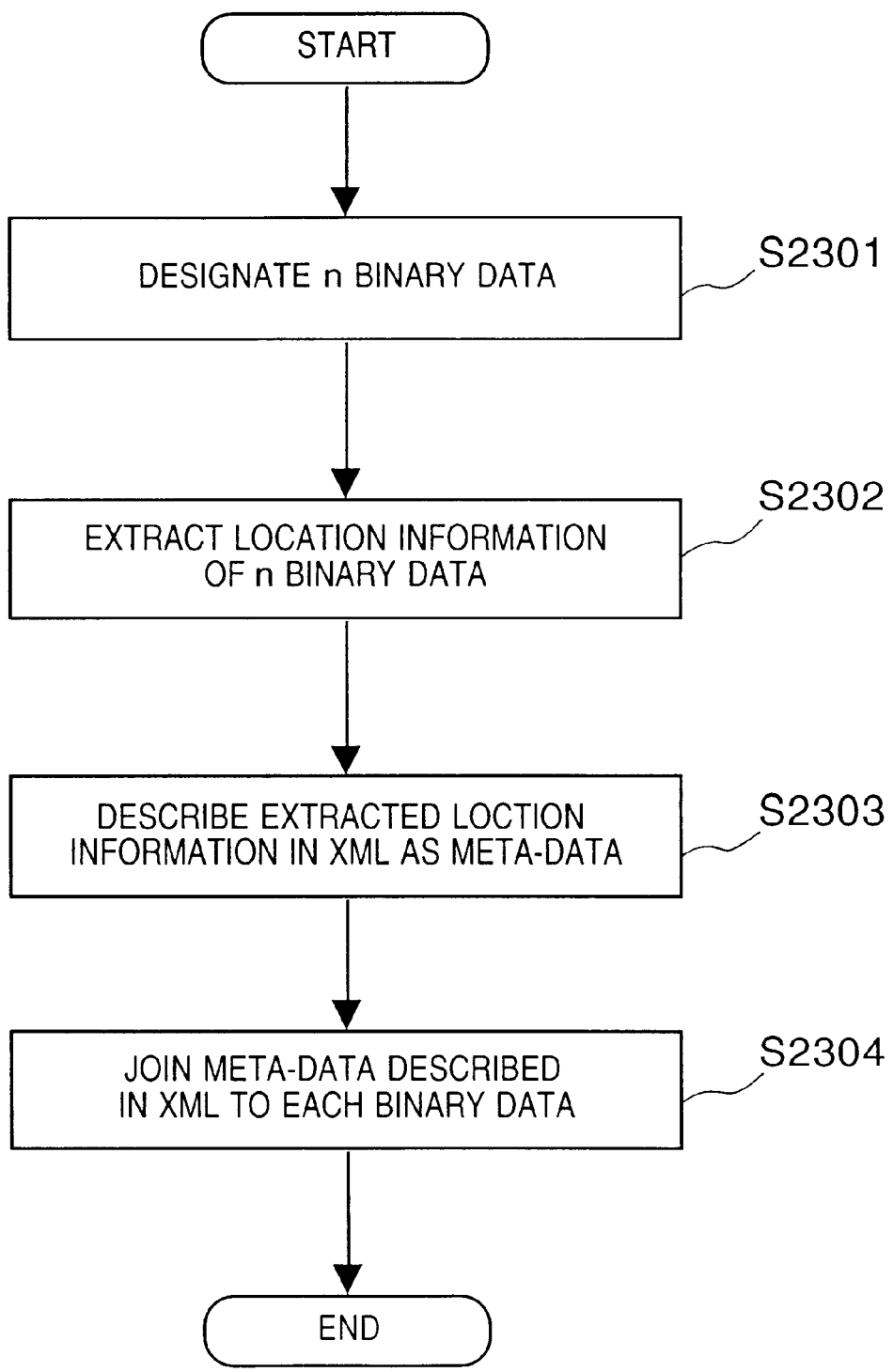
FIG. 14 is a flow chart for explaining a meta-data registration process according to the fourth embodiment of the present invention.

Referring to FIG. 14, n binary data are designated by a user instruction in step S2301. Various methods of designating n binary data may be used. For example, a dialog or the like may be displayed, and a plurality of data may be designated. Alternatively, after n binary data are selected, they may be dragged and dropped onto a predetermined location. In step S2302, location information is extracted from the n binary data. The location information includes a URL such as "http://www.abcdef.co.jp/images/19990427/001.jpg", an absolute path such as "c:¥My_Pictures¥1999image¥hana.jpg", or location information using an ID or the like. In step S2303, the extracted location information is described on the memory in a correct format using correct XML, thus generating meta-data.

FIG. 16 shows an example of the description contents of the meta-data generated in step S2303. Character strings bounded by <PICPATH> and </PICPATH> indicate the locations of binary data (image data files), and in the example shown in FIG. 16, the locations of three images are described using URLs.

In step S2304, the location information (=meta-data) described in correct XML on the memory is joined to each binary data. A method of joining meta-data described in a correct XML format to n binary data will be described below with reference to the flow chart shown in FIG. 15.

Figure 15:
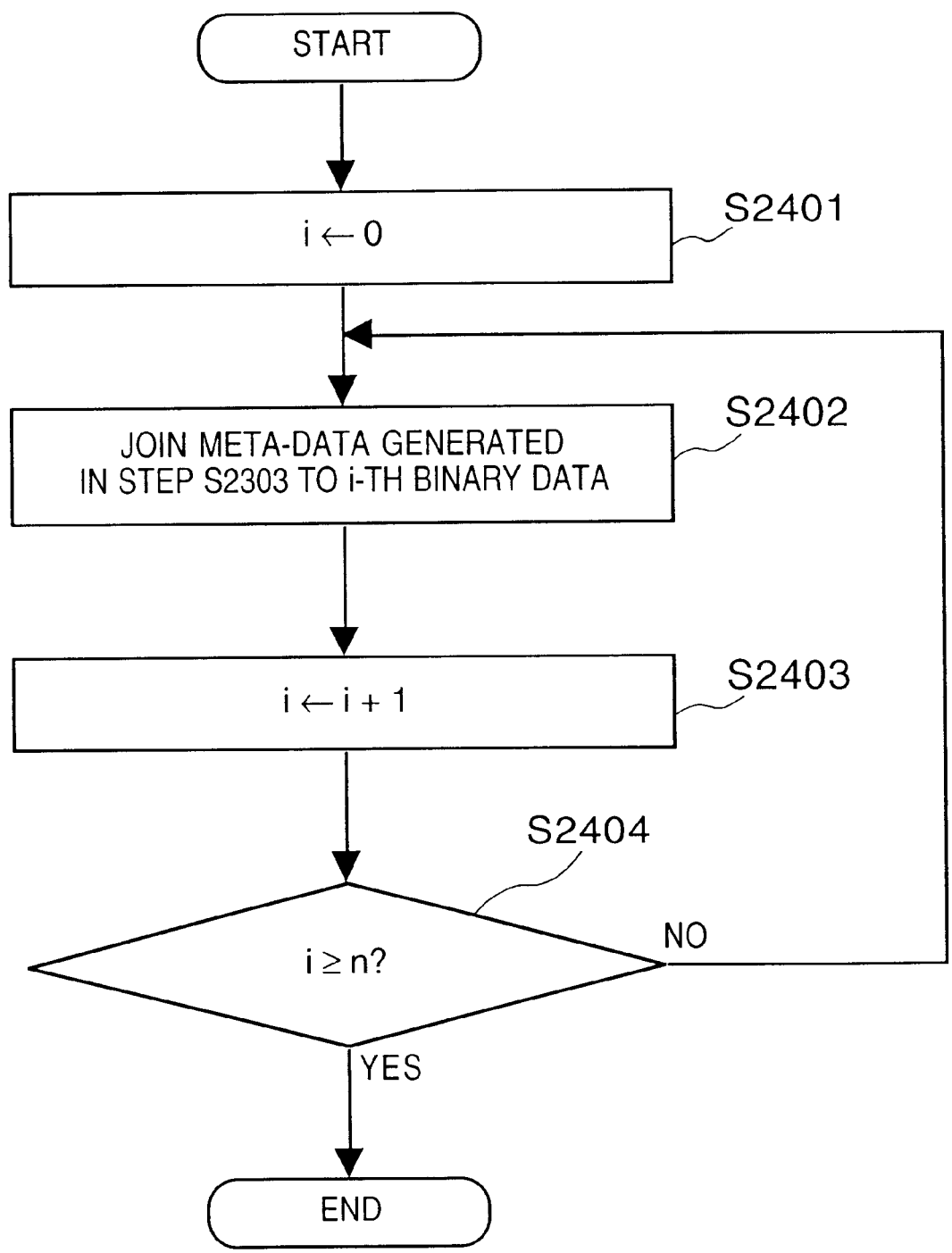
FIG. 15 is a flow chart showing a joint process of meta-data to n binary data according to the fourth embodiment.
Figure 17:
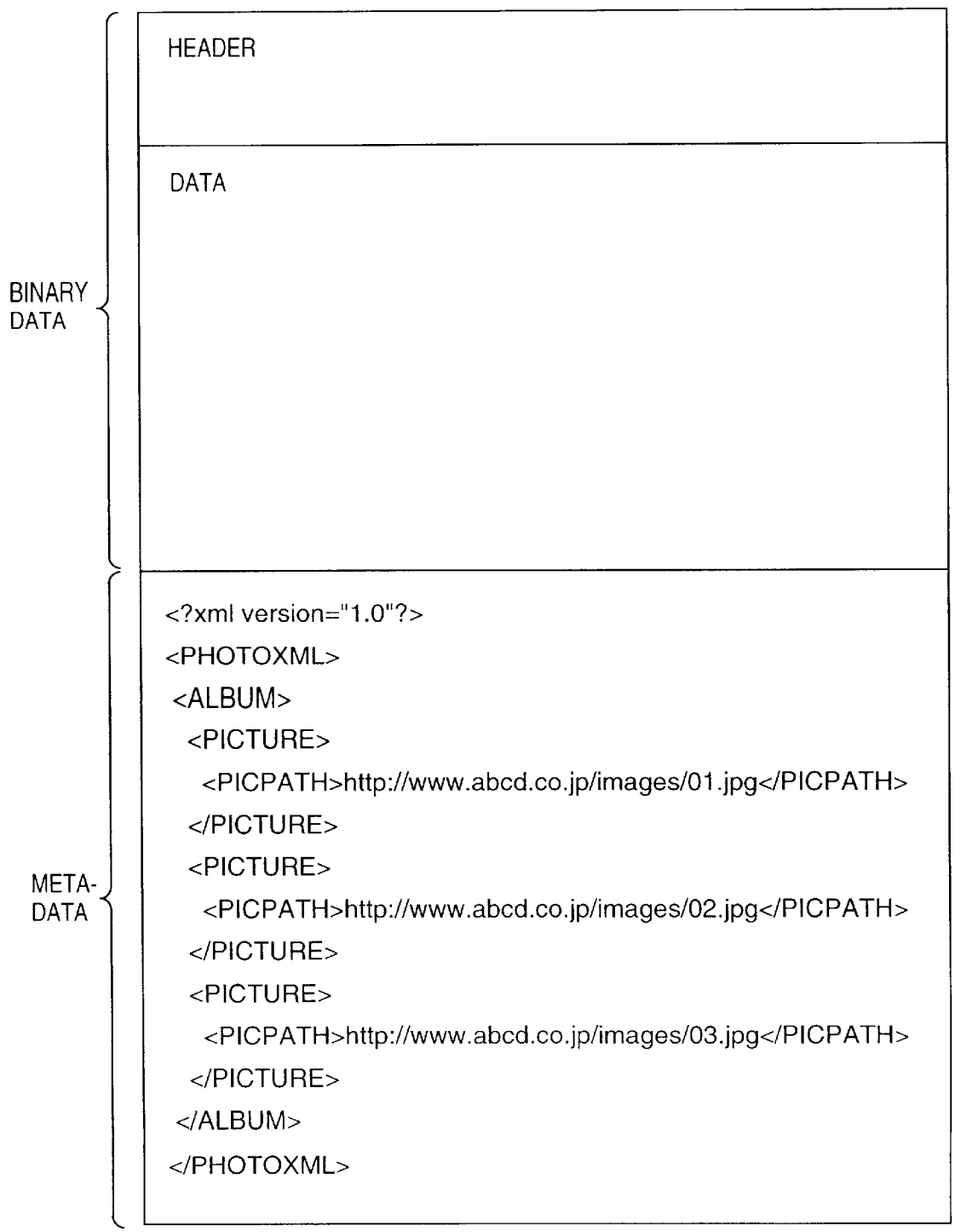
FIG. 17 is a view showing the joint state of meta-data to binary data according to the fourth embodiment.

FIG. 15 is a flow chart for explaining the sequence for joining meta-data to binary data to be processed. In step S2401, "0" is set in counter i. In step S2402, the meta-data generated in step S2303 is joined to the i-th binary data. In this case, the meta-data is joined to the end of image data. The method of joining meta-data to binary data such as image data is as has been explained in the first and third embodiments above. Note that FIG. 17 shows an example in which the meta-data shown in FIG. 16 (meta-data generated in step S2304) is joined to binary data (image data).

In step S2403, counter i is incremented by 1. In step S2404, the aforementioned processes in steps S2402 and S2403 are repeated for n binary data.

With the aforementioned processing, binary data (image data) are associated, as shown in FIG. 18. In this example, since three image data files (01.jpg, 02.jpg, and 03.jpg) are designated, as shown in FIG. 16, these image data files are associated with each other by the meta-data.

As described above, according to the fourth embodiment, since meta-data that describes the locations of a plurality of binary data in XML is generated, and is joined to the end of each binary data, if only one binary data is available, the locations of a plurality of binary data associated with that binary data can be confirmed. As described in the first to third embodiments, since meta-data is connected to the end of binary data, binary data can be reproduced using an existing browser.

Fifth Embodiment

In the fourth embodiment, the method of registering meta-data that describes the locations of a plurality of binary data in binary data has been explained. In the fifth embodiment, processes for checking if meta-data is registered in image data, extracting and analyzing the meta-data if it is registered, and displaying image data described in the registered meta-data will be explained. In the fifth embodiment, image files are loaded on the basis of the analysis result of meta-data, and the loaded images are displayed. However, thumbnails may be generated using the locations of such images, or a new page composed of a plurality of images may be described. Also, audio data and moving image data may be used in place of image data. In such case, the playback method is changed in correspondence with the formats of those data.

Note that the arrangement of the data processing apparatus in the fifth embodiment is the same as that in the fourth embodiment (FIG. 1), and a detailed description thereof will be omitted.

Figure 19:
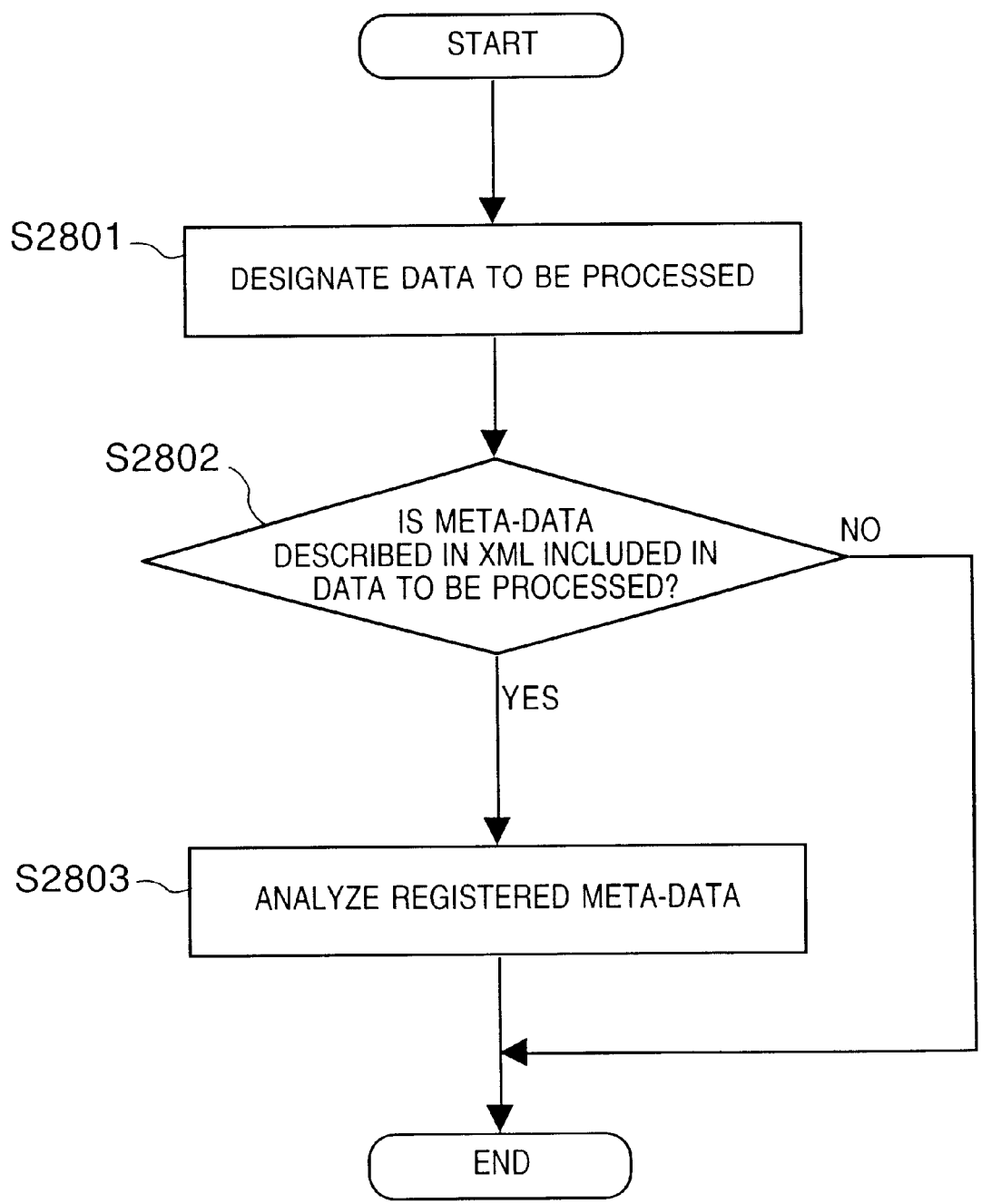
FIG. 19 is a flow chart showing the analysis sequence of data to be processed according to the fifth embodiment of the present invention.

The processes for checking the presence/absence of meta-data that describes the locations of image data, which has been explained in the fourth embodiment, in a designated file, extracting the registered meta-data, and confirming the locations of a plurality of image data will be explained. FIG. 19 is a flow chart showing the discrimination/extraction sequence of registered meta-data according to the fifth embodiment.

Referring to FIG. 19, image data which is to undergo discrimination as to whether or not meta-data is registered is designated by a user instruction in step S2801. It is discriminated in step S2802 if meta-data described in XML is registered in the image data. Details of the discrimination process in step S2802 are as has been explained using the flow chart in FIG. 7 (second embodiment).

More specifically, in the fifth embodiment, the contents of image data registered with meta-data are as shown in FIG. 17. Therefore, the presence/absence of meta-data is discriminated as follows. That is, the entire image data is loaded onto the memory (step S601), and it is checked if a character string "</PhotoXML>" is present at the end of the loaded image data (step S602). If such character string is present, it is checked if a character string "<PhotoXML>" is present before the character string "</PhotoXML>", and it is also confirmed if meta-data bounded by these character strings is described in a correct XML format (step S603). If it is confirmed that the data has a correct format, it is concluded that meta-data is registered, and this process ends (step S604). On the other hand, if no "</PhotoXML>" is present, if no "<PhotoXML>" is present, or if the description bounded by "<PhotoXML>" and "</PhotoXML>" is incorrect, it is concluded that meta-data is not registered, thus ending this process (step S605).

In this manner, if it is determined that meta-data is registered, the flow advances from step S2802 to step S2803. On the other hand, if it is determined that no meta-data is registered, the processing ends. In step S2803, the contents of the registered meta-data are analyzed. Details of the analysis method will be explained below using the flow chart in FIG. 20.

Figure 20:
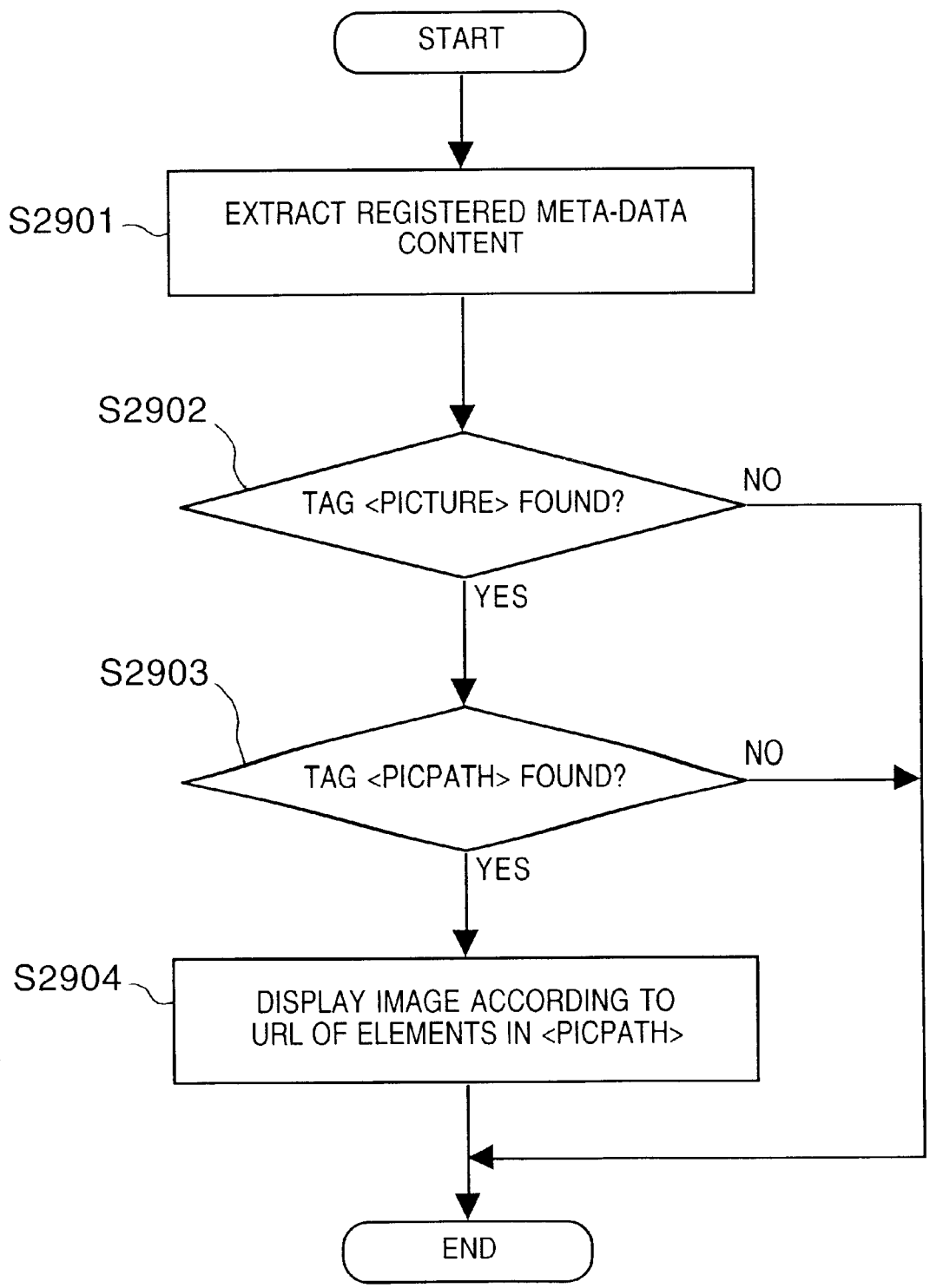
FIG. 20 is a flow chart showing the analysis method in meta-data according to the fifth embodiment.
Figure 21:
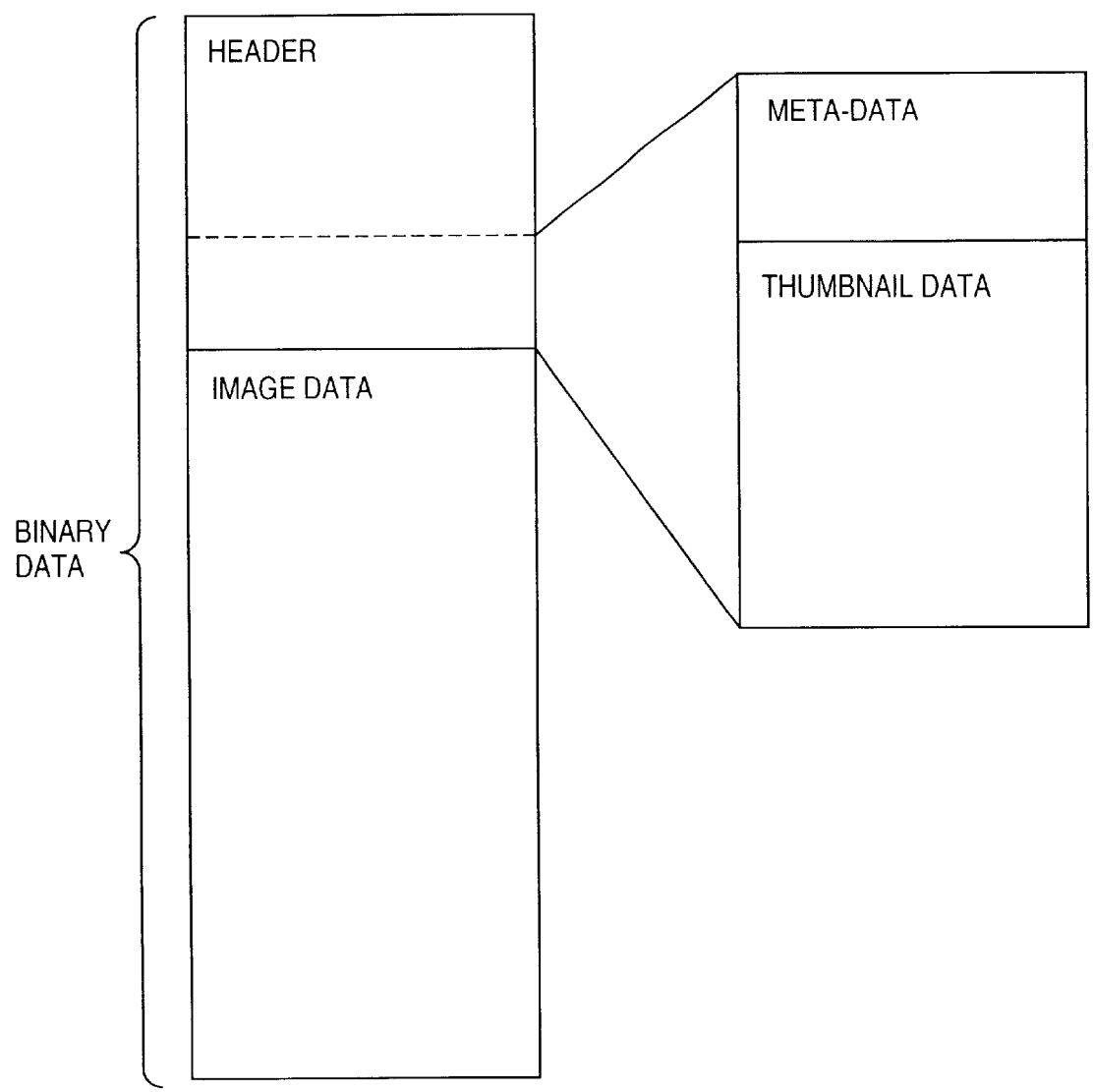
FIG. 21 shows the format of binary data in which meta-data is embedded.
Figure 22:
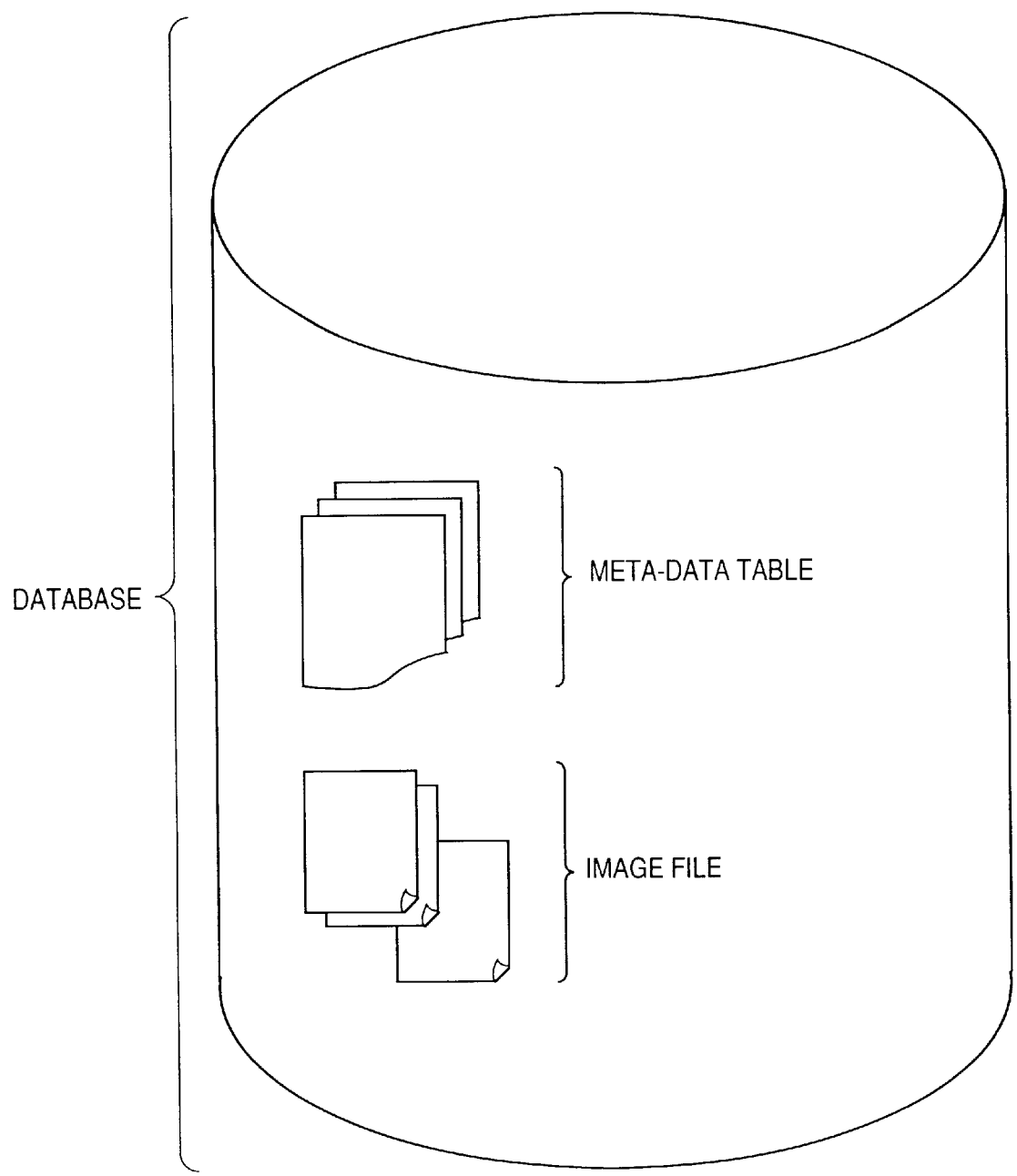
FIG. 22 shows the concept of a method of managing binary data and meta-data using a database.
Figure 23:
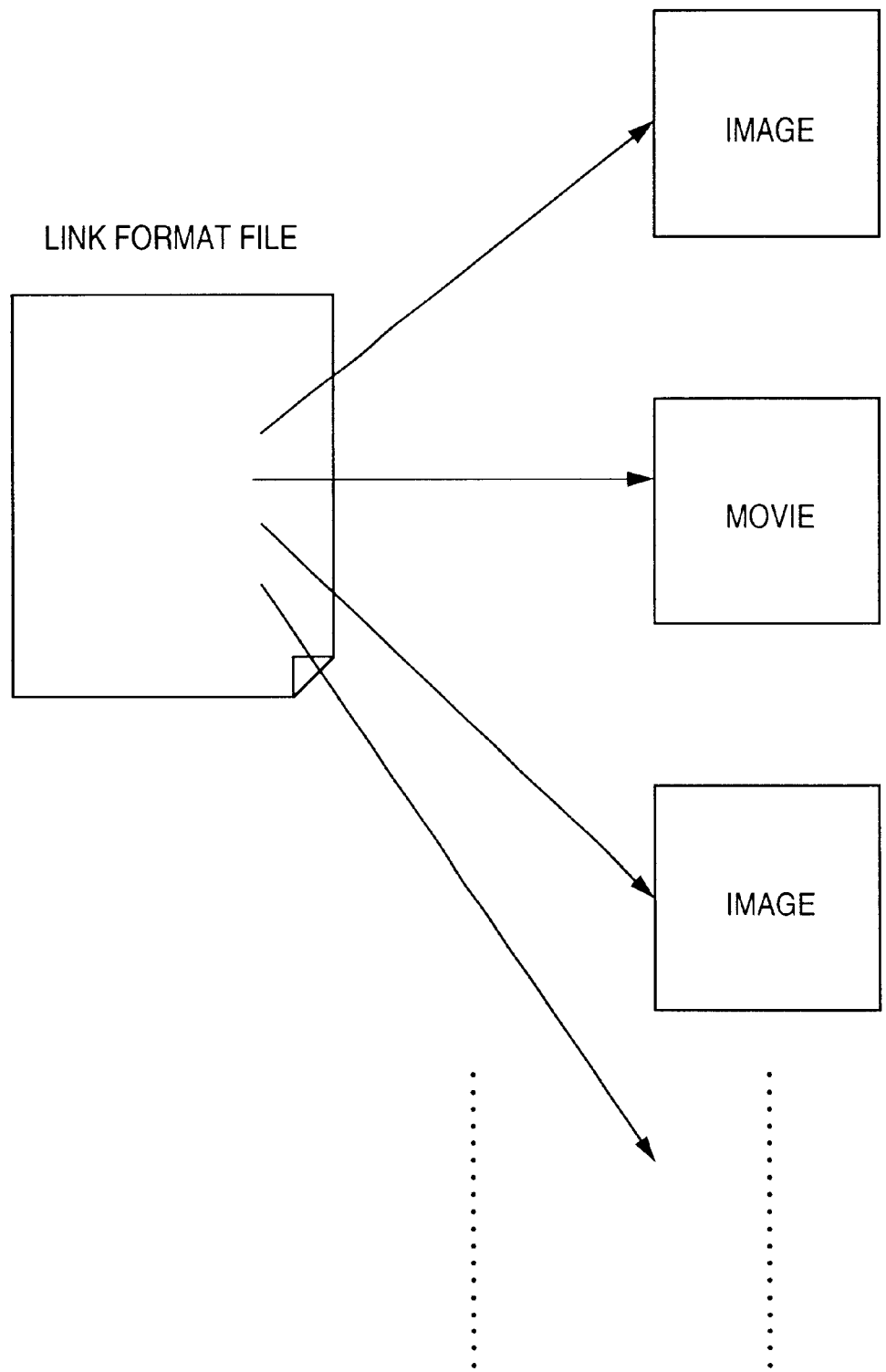
FIG. 23 shows a method of describing the locations of binary data in a general link format.
Figure 24:
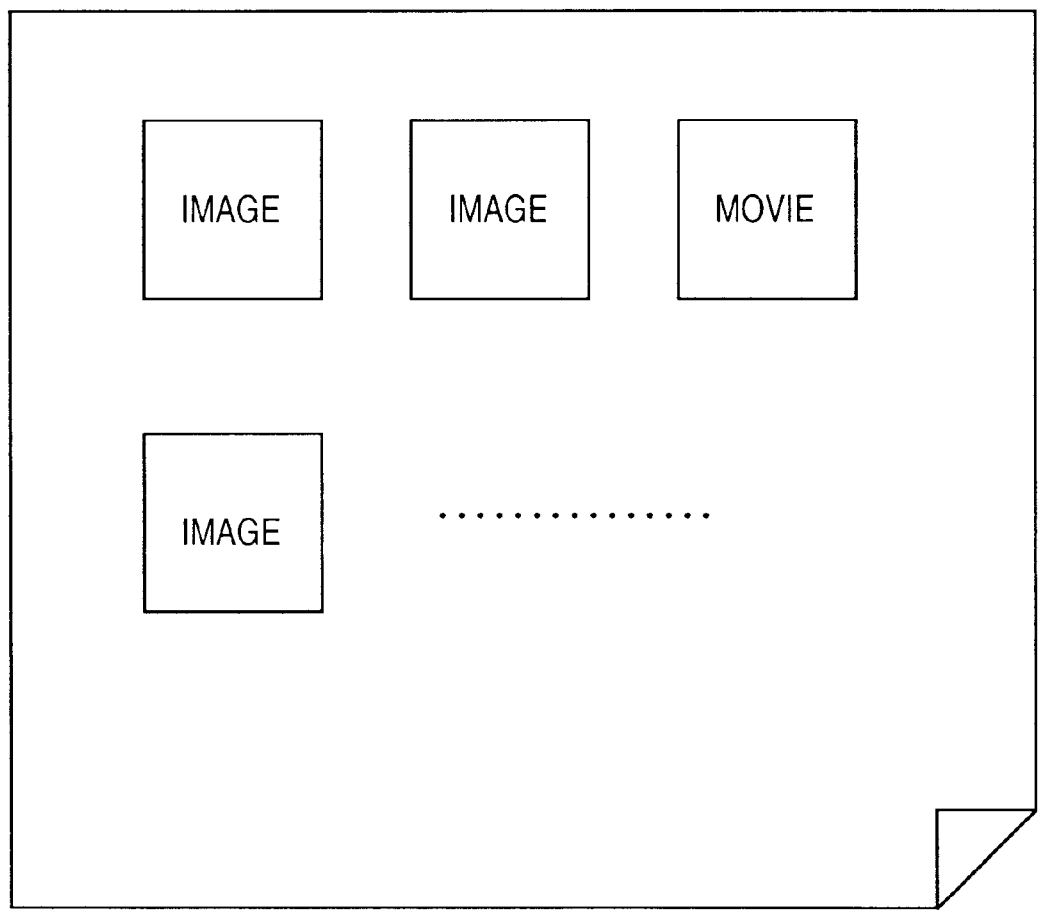
FIG. 24 shows a method of describing the relationship among binary data in a general format unique to an application.

Referring to FIG. 20, the registered meta-data contents are extracted in step S2901. It is checked in step S2902 if data bounded by "<PICTURE>" and "</PICTURE>" is present in the meta-data extracted. If such data is found, the flow advances to step S2903. It is checked in step S2903 if data bounded by "<PICPATH>" and "</PICPATH>" is present in the data string bounded by "<PICTURE>" and "</PICTURE>". If such data is found, the flow advances to step S2904. In step S2904, since the data bounded by "<PICPATH>" and "</PICPATH>" represents the location of each image data file, an image data file is acquired in accordance with that data, and the acquired image is displayed on the display 103. In this embodiment, since an URL is described between "<PICPATH>" and "</PICPATH>", an image data file is acquired according to that URL.

On the other hand, if no data bounded by "<PICTURE>" and "</PICTURE>" is found in step S2902, or if no data bounded by "<PICPATH>" and "</PICPATH>" is found in step S2903, this process ends.

With the aforementioned processes, the locations of a plurality of images can be detected from a single image. In this embodiment, the location of each image is described using a URL, but may be described using a URN, ID, image path name, or the like.

As described above, according to the fifth embodiment, by designating only an image file to which meta-data indicating the locations of a plurality of image files is joined, a set of image data can be detected. More specifically, by designating only one file in an album, the contents of the album can be restored.

As can be seen from the descriptions of the fourth and fifth embodiments, when location information of each of a plurality of binary data is described as meta-data in a data description language, and that meta-data is joined to the end of each binary data, a plurality of binary data can be associated without requiring any link format file or a huge file having a format unique to a given application.

Also, according to the present invention, a set of a plurality of binary data can be detected from single binary data. Hence, each binary data can be handled as it is.

Furthermore, binary data registered with meta-data can be discriminated from normal binary data. Moreover, as for binary data in which a plurality of meta-data are registered, dedicated tools of an existing data description language can be used without any modifications upon registration or search of meta-data, thus saving extra efforts for development.

In addition, since meta-data contents can be easily separated, they can be used as a link format file.

In the above embodiments, XML data is used as meta-data. However, the present invention is not limited to such specific data. For example, other data description languages such as SGML, HTML, and the like may be used. Also, still image data, moving image data, audio data, and the like can be used as binary data.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which stores a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the claims.

What is claimed is:

1. A data processing method for appending meta-data to binary data, comprising:

the acquisition step of acquiring data to be processed including a binary data content and meta-data content, and meta-data to be appended to the binary data;

the detection step of detecting the meta-data content at an end of the data to be processed acquired in the acquisition step; and the connection step of connecting a new meta-data content generated on the basis of the meta-data content detected in the detection step, and the meta-data acquired in the acquisition step to an end of the binary data content included in the data to be processed.

2. The method according to claim 1, further comprising the output step of outputting whole data obtained in the connection step as a single file.

3. The method according to claim 1, wherein the connection step includes the step of generating the new meta-data content by connecting the meta-data acquired in the acquisition step to an end of the meta-data content detected in the detection step.

4. The method according to claim 1, wherein the connection step includes the step of generating the new meta-data content by replacing at least one meta-data included in the meta-data content detected in the detection step by the meta-data acquired in the acquisition step.

5. The method according to claim 1, wherein the connection step can set an operation mode for inhibiting the connection step from being executed when the meta-data content is detected in the detection step.

6. The method according to claim 1, further comprising the judging step of judging if the meta-data acquired in the acquisition step is described in a correct format in a predetermined data description language, and wherein the connection step is executed when it is determined in the judging step that the meta-data is described in the correct format.

7. The method according to claim 6, wherein the judging step includes the step of also judging if the meta-data satisfies correctness as the predetermined data description language.

8. The method according to claim 1, wherein the binary data is image data.

9. The method according to claim 1, wherein the binary data is audio data.

10. The method according to claim 1, wherein the binary data is moving image data.

11. The method according to claim 1, wherein the meta-data is described in XML.

12. The method according to claim 1, wherein the meta-data is described in SGML.

13. The method according to claim 1, wherein the meta-data is described in HTML.

14. A data processing apparatus for appending meta-data to binary data, comprising:

acquisition means for acquiring data to be processed including a binary data content and meta-data content, and meta-data to be appended to the binary data;

detection means for detecting the meta-data content at an end of the data to be processed acquired by said acquisition means; and connection means for connecting a new meta-data content generated on the basis of the meta-data content detected by said detection means, and the meta-data acquired by said acquisition means to an end of the binary data content included in the data to be processed.

15. The apparatus according to claim 14, further comprising output means for outputting whole data obtained by said connection means as a single file.

16. The apparatus according to claim 14, wherein said connection means generates the new meta-data content by connecting the meta-data acquired by said acquisition means to an end of the meta-data content detected by said detection means.

17. The apparatus according to claim 14, wherein said connection means generates the new meta-data content by replacing at least one meta-data included in the meta-data content detected by said detection means by the meta-data acquired by said acquisition means.

18. The apparatus according to claim 14, wherein said connection means can set an operation mode for inhibiting said connection means from being executed when the meta-data content is detected by said detection means.

19. The apparatus according to claim 14, further comprising judging means for judging if the meta-data acquired by said acquisition means is described in a correct format in a predetermined data description language, and wherein said connection means is executed when said judging means determines that the meta-data is described in the correct format.

20. The apparatus according to claim 19, wherein said judging means also judges if the meta-data satisfies correctness as the predetermined data description language.

21. The apparatus according to claim 14, wherein the binary data is image data.

22. The apparatus according to claim 14, wherein the binary data is audio data.

23. The apparatus according to claim 14, wherein the binary data is moving image data.

24. The apparatus according to claim 14, wherein the meta-data is described in XML.

25. The apparatus according to claim 14, wherein the meta-data is described in SGML.

26. The apparatus according to claim 14, wherein the meta-data is described in HTML.

27. A storage medium for storing a control program which can be executed by a computer, said control program comprising:

a code of the acquisition step of acquiring data to be processed including a binary data content and meta-data content, and meta-data to be appended to the binary data;

a code of the detection step of detecting the meta-data content at an end of the data to be processed acquired in the acquisition step; and a code of the connection step of connecting a new meta-data content generated on the basis of the meta-data content detected in the detection step, and the meta-data acquired in the acquisition step to an end of the binary data content included in the data to be processed.

* * * * *